United States Patent
Zhu

(10) Patent No.: US 12,245,179 B2
(45) Date of Patent: *Mar. 4, 2025

(54) POINT-TO-MULTIPOINT DATA TRANSMISSION METHOD AND ELECTRONIC DEVICE

(71) Applicant: Huawei Technologies Co., Ltd., Shenzhen (CN)

(72) Inventor: Yuhong Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

This patent is subject to a terminal disclaimer.

(21) Appl. No.: 17/311,188

(22) PCT Filed: Dec. 7, 2018

(86) PCT No.: PCT/CN2018/119930
§ 371 (c)(1),
(2) Date: Jun. 4, 2021

(87) PCT Pub. No.: WO2020/113588
PCT Pub. Date: Jun. 11, 2020

(65) Prior Publication Data
US 2022/0039041 A1    Feb. 3, 2022

(51) Int. Cl.
*H04W 56/00*    (2009.01)
*G06F 3/16*    (2006.01)
(Continued)

(52) U.S. Cl.
CPC ........ *H04W 56/0025* (2013.01); *G06F 3/165* (2013.01); *H04L 12/40058* (2013.01);
(Continued)

(58) Field of Classification Search
CPC .............. H04W 56/0025; H04W 4/80; H04W 56/0015; H04W 64/00; G06F 3/165;
(Continued)

(56) References Cited

U.S. PATENT DOCUMENTS 6,058,106 A    5/2000    Cudak et al.
10,244,307 B1    3/2019    Tong et al.
(Continued)

FOREIGN PATENT DOCUMENTS

CN    101129025 A    2/2008
CN    103023866 A    4/2013
(Continued)

OTHER PUBLICATIONS

Bluetooth SIG Proprietary "Bluetooth Core Specification v5.0," Dec. 6, 2016, 2822 pages.
(Continued)

*Primary Examiner* — David L Ton
(74) *Attorney, Agent, or Firm* — Conley Rose, P.C.

(57) ABSTRACT

A point-to-multipoint data transmission method includes separately transmitting, by an electronic device, audio data to a first earbud and a second earbud through two connected isochronous streams (CISs) of a same connected isochronous group (CIG), where the two CISs share a CIG presentation point of the CIG, where the CIG presentation point is a time point at which the first earbud and the second earbud play the audio data, transmitting, by the electronic device, the audio data to the first earbud through the first CIS from an anchor point of the first CIS, and transmitting, by the electronic device, the audio data to the second earbud through the second CIS from an anchor point of the second CIS.

20 Claims, 14 Drawing Sheets

(51) Int. Cl.
  *H04L 1/00* (2006.01)
  *H04L 12/40* (2006.01)
  *H04R 3/12* (2006.01)
  *H04R 5/033* (2006.01)
  *H04W 4/80* (2018.01)
  *H04W 64/00* (2009.01)
  *H04M 1/60* (2006.01)

(52) U.S. Cl.
  CPC .............. *H04R 3/12* (2013.01); *H04R 5/033* (2013.01); *H04W 4/80* (2018.02); *H04W 56/0015* (2013.01); *H04W 64/00* (2013.01); *H04L 2001/0093* (2013.01); *H04M 1/6066* (2013.01); *H04R 2420/07* (2013.01)

(58) Field of Classification Search
  CPC ......... H04L 12/40058; H04L 12/40071; H04L 2001/0093; H04R 5/033; H04R 3/12; H04R 2420/07; H04M 1/6066
  See application file for complete search history.

(56) References Cited

U.S. PATENT DOCUMENTS

| | | |
|---|---|---|
| 2006/0194538 A1 | 8/2006 | Palin et al. |
| 2009/0327718 A1 | 12/2009 | Hirai |
| 2010/0295993 A1 | 11/2010 | Oh |
| 2013/0117693 A1 | 5/2013 | Anderson et al. |
| 2014/0029701 A1 | 1/2014 | Newham et al. |
| 2014/0348327 A1 | 11/2014 | Linde et al. |
| 2016/0359925 A1 | 12/2016 | Song |
| 2017/0034646 A1 | 2/2017 | Song |
| 2017/0244576 A1 | 8/2017 | Batra et al. |
| 2017/0251469 A1 | 8/2017 | Lee et al. |
| 2017/0373881 A1 | 12/2017 | Yu et al. |
| 2022/0078541 A1* | 3/2022 | Zhu ................ H04R 1/1041 |

FOREIGN PATENT DOCUMENTS

| | | | | |
|---|---|---|---|---|
| CN | 105446474 A | | 3/2016 | |
| CN | 107295434 A | | 10/2017 | |
| CN | 107708006 A | | 2/2018 | |
| CN | 107820325 A | | 3/2018 | |
| CN | 108111953 A | | 6/2018 | |
| CN | 108337595 A | * | 7/2018 | |
| CN | 108419228 A | | 8/2018 | |
| CN | 108496374 A | | 9/2018 | |
| CN | 108710486 A | | 10/2018 | |
| CN | 108718361 A | | 10/2018 | |
| CN | 108834013 A | | 11/2018 | |
| CN | 108900981 A | | 11/2018 | |
| WO | 2018053159 A1 | | 3/2018 | |
| WO | WO-2020107466 A1 | * | 6/2020 | ............. G06F 3/165 |
| WO | WO-2020113588 A1 | * | 6/2020 | ............. G06F 3/165 |
| WO | WO-2020133183 A1 | * | 7/2020 | |

OTHER PUBLICATIONS

Arumugam, K., et al., "CIS 700/002 : Special Topics :Bluetooth: With Low Energy comes Low Security," Feb. 3, 2017, 18 pages.

CSWG, "Isochronous Channels, Bluetooth Change Request," Jul. 7, 2018, 159 pages.

Zheng, Y., et al., "Design and Application of Multi-functional Bluetooth Accessories for Mobile Phones," Journal of Ningbo University (NSEE), vol. 21, No. 3,Sep. 2008, issn:1001-5132, Sep. 2008, 6 pages with Abstract.

\* cited by examiner

POINT-TO-MULTIPOINT DATA TRANSMISSION METHOD AND ELECTRONIC DEVICE

CROSS-REFERENCE TO RELATED APPLICATIONS

This application is a U.S. National Stage of International Patent Application No. PCT/CN2018/119930 filed on Dec. 7, 2018, which is hereby incorporated by reference in its entirety.

TECHNICAL FIELD

Embodiments of this application relate to the field of short-range communications technologies, and in particular, to a point-to-multipoint data transmission method and an electronic device.

BACKGROUND

A basic rate (basic rate, BR)/enhanced data rate (enhanced data rate, EDR) technology is a point-to-point Bluetooth communications technology, and may be applied to streaming media transmission. For example, the BR/EDR technology may be applied to audio data transmission between an electronic device (such as a mobile phone) and a Bluetooth headset.

With progress of science and technology, true wireless stereo (true wireless stereo, TWS) headsets have been gaining in popularity. The TWS headset includes two headset main bodies, for example, which are respectively referred to as a left earbud and a right earbud, and no cable connection is required between the left earbud and the right earbud. If the TWS headset is used as an audio input/output device of the mobile phone, point-to-multipoint audio data transmission between the mobile phone and the left and right earbuds of the TWS headset needs to be implemented, and the left and right earbuds of the TWS headset needs to synchronously play audio data. It is clearly that the BR/EDR technology cannot support point-to-multipoint data transmission.

A Bluetooth low energy (Bluetooth low energy, BLE) technology can support the point-to-multipoint data transmission. However, in the BLE technology, the point-to-multipoint data transmission is implemented through broadcasting, and it cannot be ensured that audio data transmitted by the mobile phone to the left and right earbuds is synchronously played. That the audio data transmitted to the left and right earbuds is synchronously played means that: for same audio data, the left and right earbuds simultaneously play the audio data. Therefore, a point-to-multipoint synchronous transmission solution urgently needs to be proposed.

SUMMARY

Embodiments of this application provide a point-to-multipoint data transmission method, so that left and right earbuds of a TWS headset can synchronously play audio data.

According to a first aspect, an embodiment of this application provides a point-to-multipoint data transmission method, and the method may be applied to audio data transmission between an electronic device and a first earbud and a second earbud of a TWS headset. Specifically, the electronic device may use an isochronous (isochronous, ISO) channel (channel) transmission mechanism in BLE to separately transmit audio data to the first earbud and the second earbud through two CISs (for example, a first CIS and a second CIS) in a same connected isochronous group (connected isochronous group, CIG) (for example, a first CIG). The electronic device may perform audio data transmission with the first earbud through the first CIS from an anchor point of the first CIS, and perform audio data transmission with the second earbud through the second CIS from an anchor point of the second CIS.

An ISO channel in the BLE defines a transmission mechanism. In the transmission mechanism, a plurality of CISs in a same CIG may share a same CIG presentation point. In this way, the first earbud and the second earbud can simultaneously play received audio data at a CIG presentation point of the first CIG. This can implement synchronization of playing audio data by left and right earbuds.

In the ISO channel transmission mechanism, the first CIS and the second CIS each include a plurality of CIS events, the first CIG includes a plurality of CIG events, and each CIG event includes one CIS event of the first CIS and one CIS event of the second CIS.

With reference to the first aspect, in a possible design, the electronic device may perform audio data transmission with the first earbud and the second earbud of the TWS headset in a serial scheduling transmission manner.

In the serial scheduling transmission manner, the anchor point of the first CIS is different from the anchor point of the second CIS. In addition, in a CIG event, the anchor point of the first CIS is a CIG anchor point, and the anchor point of the second CIS is the same as an end point of a CIS event of the first CIS. The CIG anchor point is a start time point of the CIG event.

With reference to the first aspect, in another possible design, to improve anti-interference performance of audio data transmission, the electronic device may perform audio data transmission with the first earbud and the second earbud of the TWS headset in an interleaved scheduling transmission manner.

In the interleaved scheduling transmission manner, the anchor point of the first CIS is different from the anchor point of the second CIS. Each CIS event of the first CIS includes N1 subevents, and N1 is greater than or equal to 2. Each CIS event in the second CIS includes N2 subevents, and N2 is greater than or equal to 2. In addition, in a CIG event, the anchor point of the first CIS is a CIG anchor point, and the anchor point of the second CIS is the same as an end point of a first subevent in a CIS event of the first CIS. The CIG anchor point is a start time point of the CIG event, and a start point of a second subevent of the first CIS is an end point of a first subevent of the second CIS.

In the interleaved scheduling transmission manner, the electronic device may interleave the subevents of the first CIS and the subevents of the second CIS in terms of time, that is, may interleave audio data of the first CIS and audio data of the second CIS in terms of time for transmission. In this way, different CISs are more evenly interfered with, and the anti-interference performance of the audio data transmission can be improved.

With reference to the first aspect, in another possible design, to prevent the electronic device from repeatedly transmitting same audio data in different time periods, the electronic device may perform audio data transmission with the first earbud and the second earbud of the TWS headset in a joint scheduling transmission manner.

In the joint scheduling transmission manner, the anchor point of the first CIS is the same as the anchor point of the second CIS. In a CIG event, both the anchor point of the first CIS and the anchor point of the second CIS are CIG anchor points. The CIG anchor point is a start time point of the CIG event.

With reference to the first aspect, in another possible design, in the joint scheduling transmission manner, for each CIG event of the first CIG, the electronic device may transmit the audio data in a frequency hopping manner through the first CIS and the second CIS from a CIG anchor point of each CIG event.

In the joint scheduling transmission manner, the electronic device may send an audio data packet at a same time point (namely, the CIG anchor point) in the frequency hopping manner. In this way, the left and right earbuds of the TWS headset may also receive the audio data packets together in the frequency hopping manner. In this way, the electronic device does not repeatedly transmit same audio data in different time periods, so that a waste of transmission resources can be reduced, and effective utilization of the transmission resources can be improved.

With reference to the first aspect, in another possible design, before the electronic device performs audio data transmission with the first earbud through the first CIS in the first CIG from the anchor point of the first CIS, the method in this embodiment of this application may further include: The electronic device configures the first CIS in the first CIG for the first earbud, and configures the second CIS in the first CIG for the second earbud. The first CIS is used for audio data transmission between the electronic device and the first earbud. The second CIS is used for audio data transmission between the electronic device and the second earbud.

With reference to the first aspect, in another possible design, the electronic device may configure the first CIS in the first CIG for the first earbud through a first asynchronous connection-oriented link (asynchronous connection-oriented link, ACL); and the electronic device may configure the second CIS in the first CIG for the second earbud through a second ACL link. The first ACL link is an ACL link between the electronic device and the first earbud. The second ACL link is an ACL link between the electronic device and the second earbud.

With reference to the first aspect, in another possible design, before the electronic device configures the first CIS for the first earbud and configures the second CIS for the second earbud, the electronic device may be separately paired with the first earbud and the second earbud, establish the first ACL link with the first earbud, and establish the second ACL link with the second earbud. Then, through the first ACL link, the electronic device may negotiate first configuration information with the first earbud, and configure the first CIS in the first CIG for the first earbud. Through the second ACL link, the electronic device may negotiate second configuration information with the second earbud, and configure the second CIS in the first CIG for the second earbud.

The first configuration information may be used to determine a time point at which the first earbud receives audio data on an ISO channel 1 (an ISO channel between the electronic device and the first earbud), a time point at which the first earbud sends data (for example, audio data and/or feedback information) on the ISO channel 1, and a time point (for example, the CIG presentation point) at which the first earbud plays the audio data. After determining the time points, the first earbud may perform audio data sending, receiving, and playing based on the time points.

The second configuration information may be used to determine a time point at which the second earbud receives audio data on an ISO channel 2 (an ISO channel between the electronic device and the second earbud), a time point at which the second earbud sends data (for example, audio data and/or feedback information) on the ISO channel 2, and a time point (for example, the CIG presentation point) at which the second earbud plays the audio data. After determining the time points, the first earbud may perform audio data sending, receiving, and playing based on to the time points.

With reference to the first aspect, in another possible design, the first configuration information includes an identifier of the first CIG, a parameter of the first CIS, and a CIG presentation delay of the first CIG. The second configuration information includes the identifier of the first CIG, a parameter of the second CIS, and the CIG presentation delay. The parameter of the first CIS is a transmission parameter used by the electronic device to send audio data to and receive audio data from the first earbud. The parameter of the second CIS is a transmission parameter used by the electronic device to send audio data to and receive audio data from the second earbud. The CIG presentation delay is used by the first earbud and the second earbud to determine the CIG presentation point.

With reference to the first aspect, in another possible design, the parameter of the first CIS includes an identifier of the first CIS, N1, a first retransmission parameter, a first sub-interval, a first time parameter, the first synchronization delay, and the CIG presentation delay. The first CIS includes N1 subevents. N1 and the first retransmission parameter are used to indicate a policy for audio data retransmission between the electronic device and the first earbud. The first sub-interval is a time period between a start time point of a subevent and a start time point of a next subevent in the first CIS. The first time parameter is used to determine the anchor point of the first CIS. The first synchronization delay is used to determine a CIG synchronization point, and the CIG synchronization point is a time point after the first synchronization delay from the anchor point of the first CIS. The CIG presentation delay is a time period between the CIG synchronization point and the CIG presentation point.

With reference to the first aspect, in another possible design, the parameter of the first CIS further includes a first payload parameter and a second payload parameter. Each subevent of the first CIS includes a first transmission interval and a second transmission interval. The first transmission interval is used by the electronic device to transmit audio data to the first earbud, and the first earbud receives the audio data transmitted by the electronic device. The first payload parameter indicates a size of audio data that can be transmitted within the first transmission interval. The second transmission interval is used by the first earbud to transmit audio data to the electronic device, and the electronic device receives the audio data transmitted by the first earbud. The second payload parameter indicates a size of audio data that can be transmitted within the second transmission interval.

With reference to the first aspect, in another possible design, the parameter of the second CIS includes the identifier of the first CIS, N2, a second retransmission parameter, a second sub-interval, a second time parameter, the second synchronization delay, and the CIG presentation delay. The second CIS includes N2 subevents, and N2 is a number of subevents in the second CIS. N2 and the second retransmission parameter are used to indicate a policy for audio data retransmission between the electronic device and the second earbud. The second sub-interval is a time period between a start time point of a subevent and a start time point of a next subevent in the second CIS. The second time parameter is used to determine the anchor point of the second CIS. The second synchronization delay is used to determine a CIG synchronization point, and the CIG synchronization point is a time point after the second synchronization delay from the anchor point of the second CIS. The CIG presentation delay is a time period between the CIG synchronization point and the CIG presentation point.

With reference to the first aspect, in another possible design, the parameter of the second CIS further includes a third payload parameter and a fourth payload parameter. Each subevent of the second CIS includes a third transmission interval and a fourth transmission interval. The third transmission interval is used by the electronic device to transmit audio data to the second earbud, and the second earbud receives the audio data transmitted by the electronic device. The third payload parameter indicates a size of audio data that can be transmitted within the third transmission interval. The fourth transmission interval is used by the second earbud to transmit audio data to the electronic device, and the electronic device receives the audio data transmitted by the second earbud. The fourth payload parameter indicates a size of audio data that can be transmitted within the fourth transmission interval.

With reference to the first aspect, in another possible design, the first configuration information and the second configuration information further include an isochronous ISO interval. The first CIS and the second CIS each include the plurality of CIS events. The first CIG includes the plurality of CIG events. Each CIG event includes the CIS event of the first CIS and the CIS event of the second CIS. The anchor point of the first CIS is an anchor point of a CIS event of the first CIS in a CIG event, and the anchor point of the second CIS is an anchor point of a CIS event in the same CIG event. The ISO interval is a time period between an anchor point of a CIS event and an anchor point of a next CIS event in the first CIS or the second CIS. Each CIG event belongs to one ISO interval in terms of time, and each CIS event belongs to one ISO interval in terms of time.

According to a second aspect, an embodiment of this application provides a point-to-multipoint data transmission method, and the method may be applied to audio data transmission between an electronic device and a first earbud and a second earbud of a TWS headset. Specifically, the first earbud performs audio data transmission with the electronic device through a first CIS in a first CIG from an anchor point of the first CIS; the second earbud performs audio data transmission with the electronic device through a second CIS in the first CIG from an anchor point of the second CIS; and the first earbud and the second earbud play audio data at a CIG presentation point of the first CIG.

In this embodiment of this application, the first earbud and the second earbud use an ISO transmission mechanism in BLE to perform audio data transmission with the electronic device through two CISs (for example, the first CIS and the second CIS) of a same CIG. An ISO channel in the BLE defines a transmission mechanism. In the transmission mechanism, a plurality of CISs in a same CIG may share a same CIG presentation point. In this way, the first earbud and the second earbud can simultaneously play received audio data at the CIG presentation point of the first CIG. This can implement synchronization of playing audio data by left and right earbuds.

With reference to the second aspect, in a possible design, before the first earbud performs audio data transmission with the electronic device through the first connected isochronous stream CIS in the first connected isochronous group CIG from the anchor point of the first CIS, and the second earbud performs audio data transmission with the electronic device through the second CIS in the first CIG from the anchor point of the second CIS, the method in this embodiment of this application may further include: The first earbud receives the first CIS that is in the first CIG and that is configured by the electronic device for the first earbud, where the first CIS is used for audio data transmission between the electronic device and the first earbud; and the second earbud receives the second CIS that is in the first CIG and that is configured by the electronic device for the second earbud, where the second CIS is used for audio data transmission between the electronic device and the second earbud.

With reference to the second aspect, in a possible design, that the first earbud receives the first CIS that is in the first CIG and that is configured by the electronic device for the first earbud includes: The first earbud receives, through a first asynchronous connection-oriented link ACL, the first CIS configured by the electronic device for the first earbud, where the first ACL link is an ACL link between the electronic device and the first earbud. That the second earbud receives the second CIS that is in the first CIG and that is configured by the electronic device for the second earbud includes: The second earbud receives, through a second ACL link, the second CIS configured by the electronic device for the second earbud, where the second ACL link is an ACL link between the electronic device and the second earbud.

With reference to the second aspect, in a possible design, before the first earbud receives the first CIS that is in the first CIG and that is configured by the electronic device for the first earbud, and the second earbud receives the second CIS that is in the first CIG and that is configured by the electronic device for the second earbud, the method in this embodiment of this application further includes: The first earbud and the second earbud separately perform pairing with the electronic device; and the first earbud establishes the first ACL link with the electronic device, and the second earbud established the second ACL link with the electronic device. That the first earbud receives the first CIS that is in the first CIG and that is configured by the electronic device for the first earbud includes: The first earbud negotiates first configuration information with the electronic device through the first ACL link, where the first configuration information is used to configure the first CIS in the first CIG. That the second earbud receives the second CIS that is in the first CIG and that is configured by the electronic device for the second earbud includes: The second earbud negotiates second configuration information with the electronic device through the second ACL link, where the second configuration information is used to configure the second CIS in the first CIG. The first configuration information includes an identifier of the first CIG, a parameter of the first CIS, and a CIG presentation delay of the first CIG. The second configuration information includes the identifier of the first CIG, a parameter of the second CIS, and the CIG presentation delay. The parameter of the first CIS is a transmission parameter used by the electronic device to send audio data to and receive audio data from the first earbud. The parameter of the second CIS is a transmission parameter used by the electronic device to send audio data to and receive audio data from the second earbud. The CIG presentation delay is used by the first earbud and the second earbud to determine the CIG presentation point.

According to a third aspect, an embodiment of this application provides an electronic device. The electronic device includes one or more processors, a memory, and a wireless communications module. The memory and the wireless communications module are coupled to the one or more processors. The memory is configured to store computer program code, and the computer program code includes computer instructions. When the one or more processors execute the computer instructions, the electronic device performs the point-to-multipoint data transmission method according to any one of the first aspect or the possible implementations of the first aspect.

According to a fourth aspect, an embodiment of this application provides a TWS headset. The TWS headset includes a first earbud and a second earbud. The first earbud and the second earbud each include a processor, a memory, a wireless communications module, a receiver, and a microphone. The memory, the wireless communications module, the receiver, and the microphone are coupled to the processor. The memory is configured to store computer program code. The computer program code includes computer instructions. When the processor of the first earbud executes the computer instructions stored in the memory of the first earbud, the first earbud performs the point-to-multipoint data transmission method according to any one of the second aspect or the possible implementations of the second aspect. When the processor of the second earbud executes the computer instructions stored in the processor of the second earbud, the second earbud performs the point-to-multipoint data transmission method according to any one of the second aspect or the possible implementations of the second aspect.

According to a fifth aspect, a Bluetooth communications system is provided. The Bluetooth communications system may include the TWS headset according to the fourth aspect and the electronic device according to the third aspect.

According to a sixth aspect, a computer storage medium is provided, including computer instructions. When the computer instructions are run on an electronic device, the electronic device is enabled to perform the point-to-multipoint data transmission method according to any one of the first aspect or the possible implementations of the first aspect.

According to a seventh aspect, a computer storage medium is provided, including computer instructions. When the computer instructions are run on a first earbud of a TWS headset, the first earbud is enabled to perform the point-to-multipoint data transmission method according to any one of the second aspect or the possible implementations of the second aspect. When the computer instructions are run on a second earbud of the TWS headset, the second earbud is enabled to perform the point-to-multipoint data transmission method according to any one of the second aspect or the possible implementations of the second aspect.

According to an eighth aspect, this application provides a computer program product. When the computer program product runs on a computer, the computer is enabled to perform any one of the foregoing point-to-multipoint data transmission methods.

It may be understood that the TWS headset according to the fourth aspect, the electronic device according to the third aspect, the Bluetooth communications system according to the fifth aspect, the computer storage media according to the sixth aspect and the seventh aspect, and the computer program product according to the ninth aspect that are provided above are all configured to perform the corresponding methods provided above. Therefore, for beneficial effects that the TWS headset, the electronic device, the Bluetooth communications system, the computer storage media, and the computer program product can achieve, refer to beneficial effects in the corresponding methods provided above. Details are not described herein again.

DESCRIPTION OF EMBODIMENTS

Figure 1A:
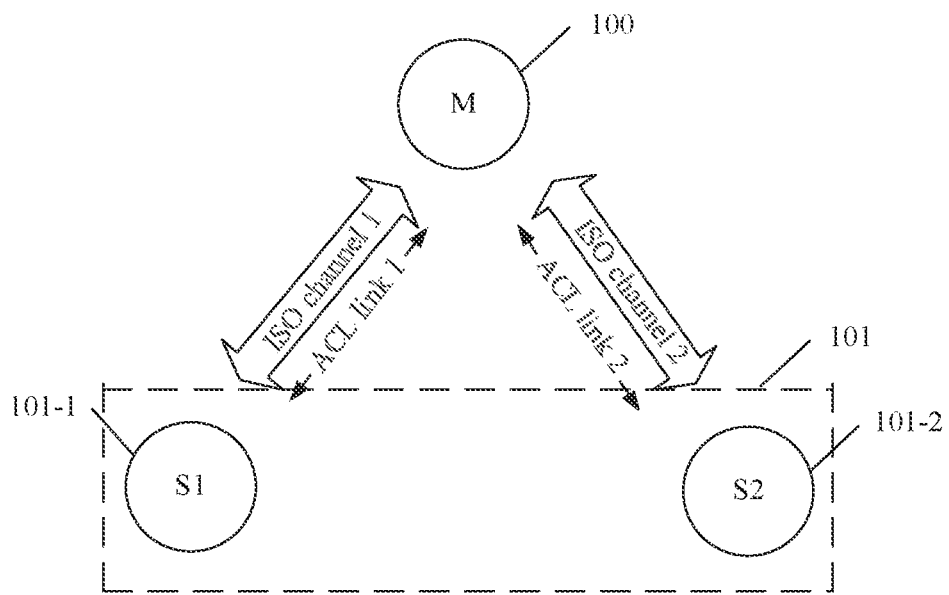
FIG. 1A is a schematic diagram of an architecture of a point-to-multipoint communications network according to an embodiment of this application.

Embodiments of this application provide a point-to-multipoint data transmission method. A source device may transmit audio data (audio stream, stream) to a plurality of destination devices by using an isochronous (isochronous, ISO) channel (channel) in BLE, so that the audio data transmitted by the source device to the plurality of destination devices is synchronously played.

The ISO channel in the BLE defines a transmission mechanism. In this transmission mechanism, one source device may send audio data to a plurality of destination devices through the ISO channel in the BLE, and audio streams of the plurality of destination devices can be synchronously played.

Specifically, in the transmission mechanism, the source device may send the audio data to the plurality of destination devices in a manner of time division multiple access (Time division multiple access, TDMA) by using a plurality of connected isochronous streams (connected isochronous stream, CIS) in one connected isochronous group (connected isochronous group, CIG). The plurality of destination devices are in a one-to-one correspondence with the plurality of CISs.

The plurality of CISs in the CIG may share a same CIG synchronization point (CIG_synchronization point) and CIG presentation point (CIG_presentation point). Both the CIG synchronization point and the CIG presentation point are time points after the source device sends the audio data. At the CIG synchronization point, all the destination devices corresponding to the plurality of CISs receive the audio data. After receiving the audio data at the CIG synchronization point, the destination devices corresponding to the plurality of CISs may simultaneously play the received audio data at the CIG presentation point, so that the audio streams of the plurality of destination devices can be synchronously played.

For example, the source device may be an electronic device such as a mobile phone, and the plurality of destination devices may be a plurality of sub-devices in a TWS headset or another peripheral device. For example, the plurality of destination devices may be left and right earbuds of the TWS headset. Based on the ISO channel in the BLE, the mobile phone may send audio data to the left and right earbuds of the TWS headset. After receiving the audio data from the mobile phone, the left and right earbuds of the TWS headset can play the received audio data at a same time point (for example, the foregoing CIG presentation point). In other words, point-to-multipoint audio data is synchronously played.

The following describes the implementations of the embodiments of this application in detail with reference to accompanying drawings.

The method in the embodiments of this application may be applied to a point-to-multipoint communications system including an electronic device and a peripheral device. The peripheral device may include a plurality of main bodies. The electronic device is the foregoing source device, and the plurality of main bodies of the peripheral device are the foregoing plurality of destination devices. The electronic device may also be referred to as a master device (Master, M for short), and the peripheral device may be referred to as a slave device (Slave, S for short).

As shown in FIG. 1A, the point-to-multipoint communications network may include an electronic device (M) 100 and a peripheral device (S) 101. The peripheral device 101 may include two main bodies, for example, a device (S1) 101-1 and a device (S2) 101-2.

The electronic device 100 supports establishment of a wireless connection to each of the device 101-1 and the device 101-2 by using Bluetooth, to implement short-range data exchange. For example, a mobile phone supports establishment of a wireless connection to each of left and right earbuds of a TWS headset by using the Bluetooth, to implement short-range data exchange. For example, the device 101-1 and the device 101-2 may perform audio data transmission with the electronic device 100 based on the wireless connection. For example, the device 101-1 and the device 101-2 are used as audio input/output devices of the electronic device 100 to implement a call. For another example, the device 101-1 and the device 101-2 are used as output devices of the electronic device 100 to implement music playing and the like.

In this embodiment of this application, that a wireless connection is established between the peripheral device 101 and the electronic device 100 by using the Bluetooth may specifically include: The electronic device 100 establishes the wireless connection to each of the two main bodies of the peripheral device 101 by using the Bluetooth. The short-range data exchange may be separately implemented between the electronic device 100 and the two main bodies of the peripheral device 101 based on the respective wireless connections.

Specifically, the electronic device 100 may establish an ACL link 1 with the device 101-1, and exchange a control command with the device 101-1 through the ACL link 1, to configure an ISO channel 1. The electronic device 100 may establish an ACL link 2 with the device 101-2, and exchange a control command with the device 101-2 through the ACL link 2, to configure an ISO channel 2. The electronic device 101 may perform audio data transmission with the device 101-1 by using one CIS (for example, a CIS (1)) in a CIG through the ISO channel 1; and the electronic device 100 may perform audio data transmission with the device 101-2 by using another CIS (for example, a CIS (2)) in the CIG through the ISO channel 2.

For example, the electronic device 100 may be a mobile phone (for example, a mobile phone 200 shown in FIG. 1B), a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)\ virtual reality (virtual reality, VR) device, a media player, a television, or the like. A specific form of the device is not particularly limited in this embodiment of this application. In this embodiment of this application, a structure of the electronic device 100 may be shown in FIG. 3, and is described in detail in the following embodiment.

In a specific implementation, the peripheral device 101 (including the device 101-1 and the device 101-2) may be a device in which two main bodies are included and no cable is required to connect the two main bodies, such as a TWS headset, a Bluetooth speaker, or a pair of smart glasses. In addition, for audio data transmitted by the electronic device 100 to the two main bodies of the peripheral device 101, the two main bodies needs to synchronously play the audio data. For example, the device 101-1 and the device 101-2 are the left and right earbuds of the TWS headset. For another example, the device 101-1 and the device 101-2 may be a pair of Bluetooth speakers.

In addition, data transmitted between the electronic device 100 and the peripheral device 101 through the ISO channel includes but is not limited to the foregoing audio data. For example, the data transmitted between the electronic device 100 and the peripheral device 101 through the ISO channel may alternatively be picture data or video data. For example, when the peripheral device 101 is a pair of smart glasses, and the device 101-1 and the device 101-2 are two lenses of the pair of smart glasses, the electronic device 100 may separately transmit picture or video data to the two lenses of the pair of smart glasses through the ISO channel. In this embodiment of this application, an example in which the electronic device 100 performs audio data transmission with the peripheral device 101 through the ISO channel is used to describe the point-to-multipoint data transmission method.

Figure 1B:
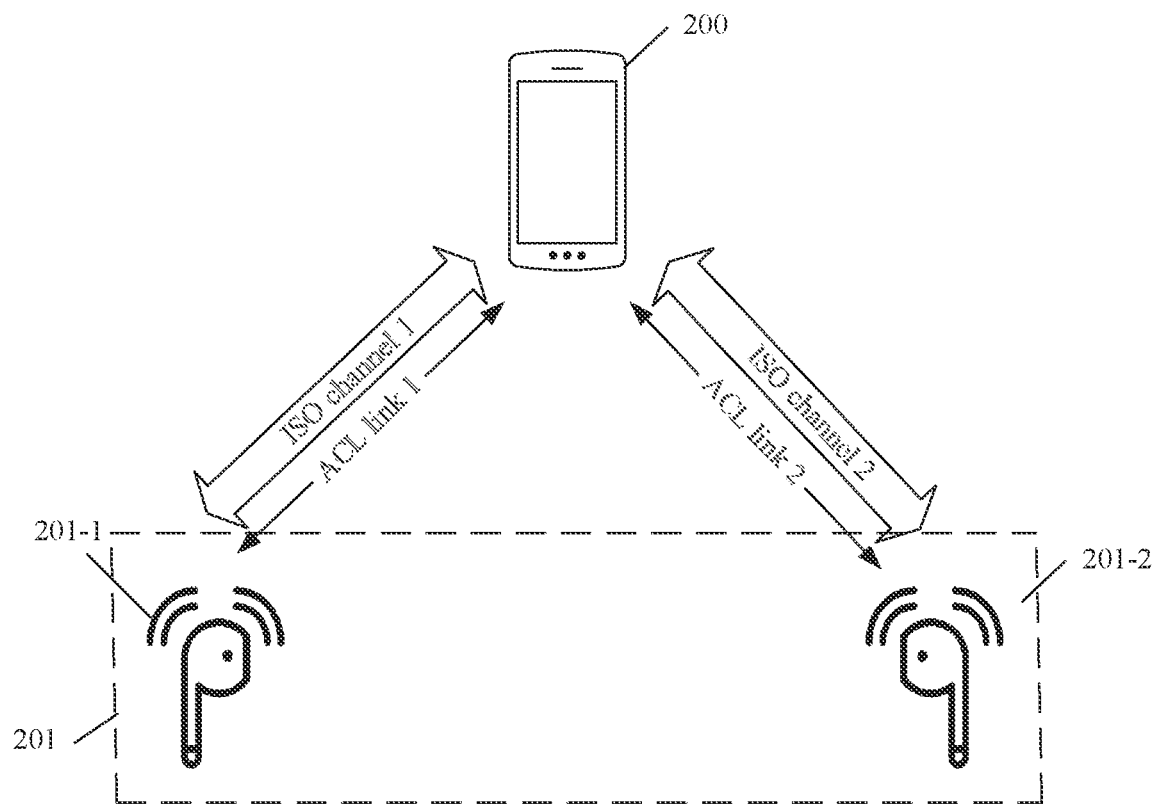
FIG. 1B is a schematic diagram of an architecture of a network used for communication between a mobile phone and a TWS headset according to an embodiment of this application.

In an example, the peripheral device 101 shown in FIG. 1A may be a TWS headset 201 shown in FIG. 1B, and the electronic device 100 shown in FIG. 1A may be the mobile phone 200 shown in FIG. 1B. The TWS headset 201 includes two main bodies (for example, headset main bodies), for example, a left earbud 201-1 and a right earbud 201-2. The mobile phone 200 establishes a wireless connection to each of the left earbud 201-1 and the right earbud 201-2 by using the Bluetooth, and performs audio data transmission based on the respective wireless connections. In this embodiment of this application, structures of the left earbud 201-1 and the right earbud 201-2 of the TWS headset 201 are shown in FIG. 2B, and are described in detail in the following embodiment.

Figure 2A:
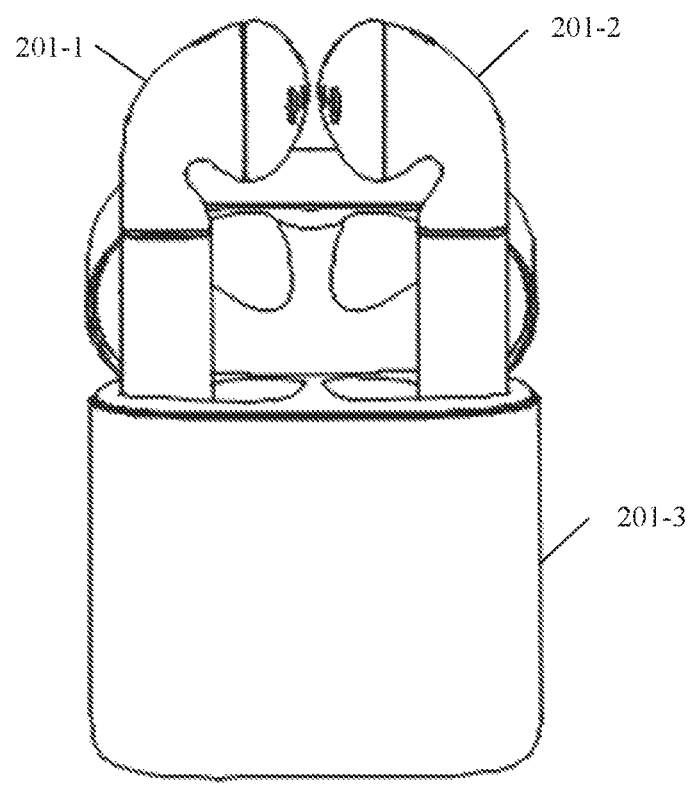
FIG. 2A is a schematic diagram of an example of a product form of a TWS headset according to an embodiment of this application.

As shown in FIG. 2A, the TWS headset 201 may include the left earbud 201-1, the right earbud 201-2, and an earbud box 201-3. The earbud box may be configured to accommodate the left and right earbuds of the TWS headset. FIG. 2A is merely a schematic diagram of an example of a product form of the TWS headset. A product form of the peripheral device provided in the embodiments of this application includes but is not limited to the TWS headset 201 shown in FIG. 2A.

Figure 2B:
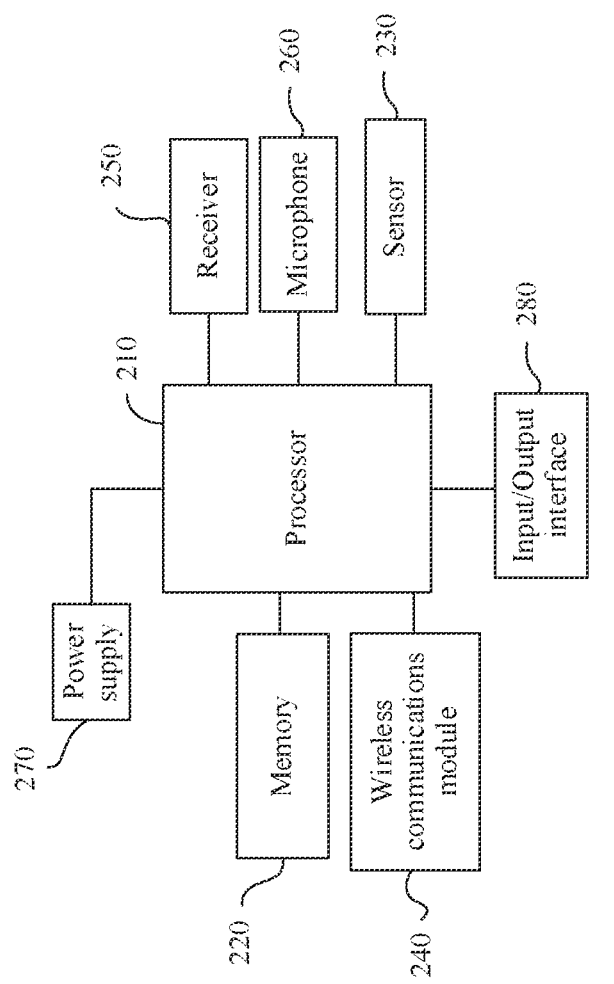
FIG. 2B is a schematic diagram of a hardware structure of an earbud of a TWS headset according to an embodiment of this application.

FIG. 2B is a schematic structural diagram of the earbud (the left earbud or the right earbud) of the TWS headset according to an embodiment of this application. As shown in FIG. 2B, the earbud (for example, the right earbud 201-2) of the TWS headset 201 may include: a processor 210, a memory 220, a sensor 230, a wireless communications module 240, a receiver 250, a microphone 260, and a power supply 270.

The memory 220 may be configured to store application program code, for example, application program code used to establish a wireless connection to another earbud (for example, the right earbud 201-2) of the TWS headset 201 and enable the earbud to be paired with and connected to the electronic device 100 (for example, the mobile phone 200). The processor 210 may control execution of the application program code, to implement a function of the earbud of the TWS headset in this embodiment of this application.

The memory 220 may further store a Bluetooth address used to uniquely identify the earbud, and store a Bluetooth address of the another earbud of the TWS headset. In addition, the memory 220 may further store connection data of an electronic device that is successfully paired with the earbud before. For example, the connection data may be a Bluetooth address of the electronic device successfully paired with the earbud. Based on the connection data, the earbud can be automatically paired with the electronic device, and a connection between the earbud and the electronic device does not need to be configured. For example, validity verification is not required. The Bluetooth address may be a media access control (media access control, MAC) address.

The sensor 230 may be a distance sensor or an optical proximity sensor. The earbud may determine, by using the sensor 230, whether the earbud is worn by a user. For example, the earbud may detect, by using the optical proximity sensor, whether there is an object near the earbud, to determine whether the earbud is worn by the user. When it is determined that the earbud is worn, the earbud may open the receiver 250. In some embodiments, the earbud may further include a bone conduction sensor, so that a bone conduction headset is obtained through combination. By using the bone conduction sensor, the earbud can obtain a vibration signal of a vibration bone of a vocal-cord part, and obtain a voice signal through parsing, to implement a voice function. In some other embodiments, the earbud may further include a touch sensor, configured to detect a touch operation of the user. In some other embodiments, the earbud may further include a fingerprint sensor, configured to detect a user fingerprint, identify a user identity, and the like. In some other embodiments, the earbud may further include an ambient optical sensor, and may adaptively adjust some parameters, such as volume, based on sensed brightness of ambient light.

The wireless communications module 240 is configured to support short-range data exchange between the earbud of the TWS headset and various electronic devices, for example, the electronic device 100. In some embodiments, the wireless communications module 240 may be a Bluetooth transceiver. The earbud of the TWS headset may establish a wireless connection to the electronic device 100 by using the Bluetooth transceiver, to implement short-range data exchange between the earbud of the TWS headset and the electronic device 100.

At least one receiver 250, also referred to as "earpiece", may be configured to convert an audio electrical signal into a sound signal and play the sound signal. For example, when the earbud of the TWS headset is used as an audio output device of the electronic device 100, the receiver 250 may convert a received audio electrical signal into a sound signal and play the sound signal.

At least one microphone 260, also referred to as "mike" or "microphone", is configured to convert a sound signal into an audio electrical signal. For example, when the earbud of the TWS headset 201 is used as an audio input device of the electronic device 100, in a process in which the user speaks (for example, makes a call or sends a voice message), the microphone 260 may collect a sound signal of the user and convert the sound signal into an audio electrical signal. The audio electrical signal is the audio data in this embodiment of this application.

The power supply 270 may be configured to supply power to each component included in the earbud of the TWS headset 201. In some embodiments, the power supply 270 may be a battery, for example, a rechargeable battery.

Generally, the TWS headset 201 is provided with an earbud box (for example, the earbud box 201-3 shown in FIG. 2A). The earbud box may be configured to accommodate the left and right earbuds of the TWS headset. As shown in FIG. 2A, the earbud box 201-3 may be configured to accommodate the left earbud 201-1 and the right earbud 201-2 of the TWS headset. In addition, the earbud box may further charge the left and right earbuds of the TWS headset 201. Correspondingly, in some embodiments, the earbud may further include an input/output interface 280. The input/output interface 280 may be configured to provide any connection between the earbud of the TWS headset and the earbud box (for example, the earbud box 201-3).

In some embodiments, the input/output interface 280 may be an electrical connector. When the earbud of the TWS headset 201 is disposed in the earbud box, the earbud of the TWS headset 201 may be electrically connected to the earbud box (for example, the input/output interface of the earbud box) by using the electrical connector. After the electrical connection is established, the earbud box may charge the power supply 270 of the earbud of the TWS headset. After the electrical connection is established, the earbud of the TWS headset 201 may further perform data communication with the earbud box. For example, the earbud of the TWS headset 201 may receive a pairing instruction from the earbud box through the electrical connection. The pairing command is used to instruct the earbud of the TWS headset 201 to enable the wireless communications module 240, so that the earbud of the TWS headset 201 can be paired with and connected to the electronic device 100 by using a corresponding wireless communications protocol (for example, the Bluetooth).

Certainly, the earbud of the TWS headset 201 may alternatively not include the input/output interface 280. In this case, the earbud may implement a charging or data communication function based on a wireless connection established between the earbud and the earbud box by using the wireless communications module 240.

In addition, in some embodiments, the earbud box (for example, the earbud box 301) may further include components such as a processor and a memory. The memory may be configured to store application program code, and the application program code is executed under control of the processor of the earbud box, to implement a function of the earbud box. For example, when the user opens a cover of the earbud box, the processor of the earbud box may send, by executing the application program code stored in the memory, a pairing command and the like to the earbud of the TWS headset in response to the operation of opening the cover of the earbud box by the user.

It may be understood that the structure shown in this embodiment of this application does not constitute a specific limitation on the earbud of the TWS headset 201. The earbud of the TWS headset 201 may have more or fewer components than those shown in FIG. 2B, or may have a combination of two or more components, or may have different component configurations. For example, the earbud may further include components such as an indicator (which may indicate a status such as a battery level of the earbud) and a dust filter (which may be used with the earpiece).

Various components shown in FIG. 2B may be implemented in hardware, software, or a combination of hardware and software that includes one or more signal processing or application-specific integrated circuits.

It should be noted that the structures of the left and right earbuds of the TWS headset 201 may be the same. For example, both the left and right earbuds of the TWS headset 201 may include the components shown in FIG. 2B. Alternatively, the structures of the left and right earbuds of the TWS headset 201 may be different. For example, one earbud (for example, the right earbud) of the TWS headset 201 may include the components shown in FIG. 2B, and the other earbud (for example, the left earbud) may include components other than the microphone 260 in FIG. 2B.

Figure 3:
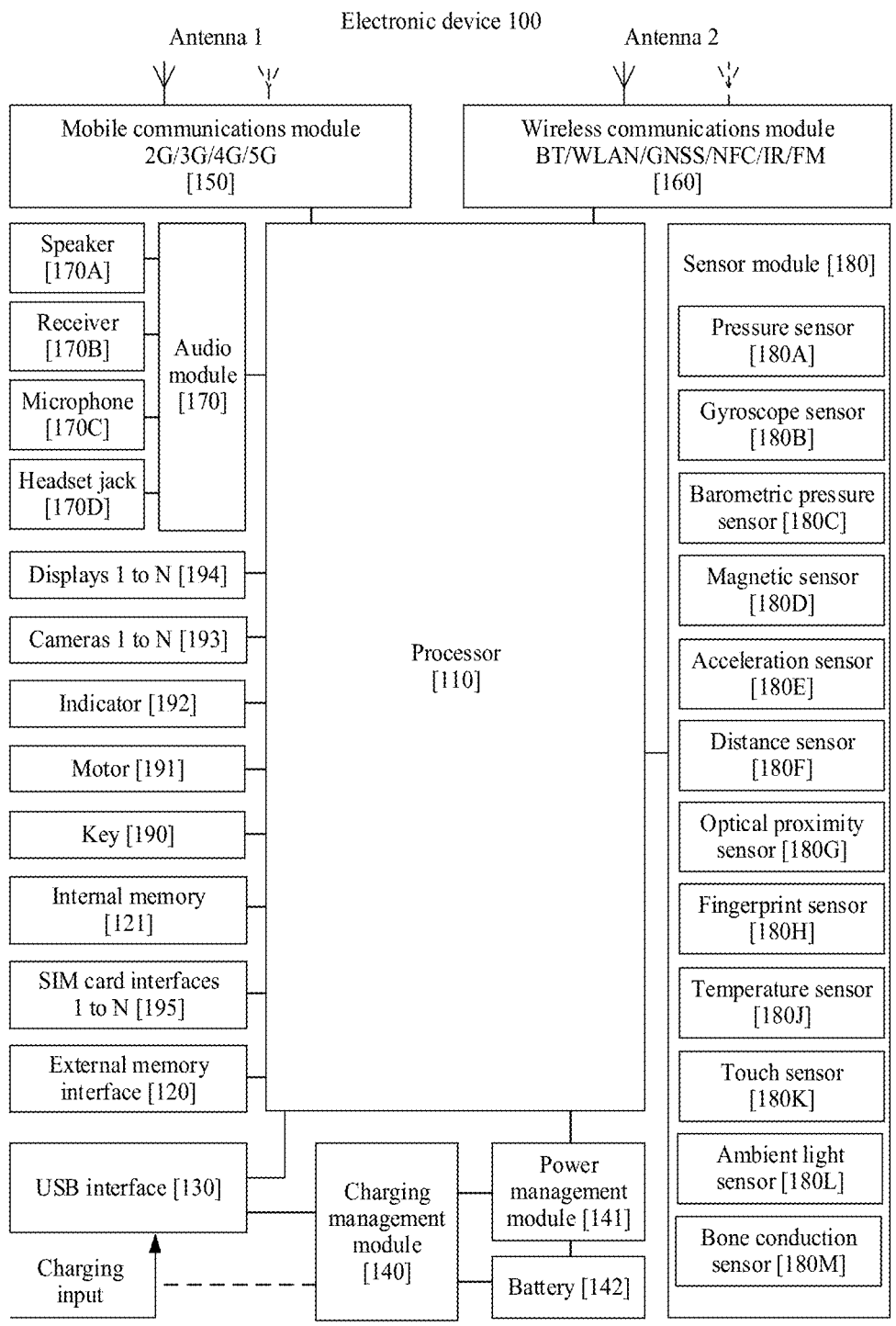
FIG. 3 is a schematic diagram of a hardware structure of an electronic device according to an embodiment of this application.

For example, the electronic device is the mobile phone 200. FIG. 3 is a schematic structural diagram of the electronic device 100. As shown in FIG. 3, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of fetch instruction and execution instruction.

The memory may further be disposed in the processor 110, and is configured to store instructions and data. In some embodiments, the memory in the processor 110 is a cache memory. The memory may store instructions or data just used or cyclically used by the processor 110.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS). For example, in this embodiment of this application, the electronic device 100 may establish a wireless connection to the peripheral device through the wireless communications module 160 by using the wireless communications technology such as the Bluetooth (BT). Based on the established wireless connection, the electronic device 100 may send voice data to the peripheral device, and may further receive voice data from the peripheral device.

The electronic device 100 implements a display function through the GPU, the display 194, the application processor, and the like. The GPU is a microprocessor for image processing, and connects the display 194 to the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. A liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini- LED, a micro-LED, a micro-OLED, quantum dot light emitting diodes (quantum dot light emitting diodes, QLED), or the like may be used for the display panel. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. In some embodiments, the ISP may be disposed in the camera 193. The camera 193 is configured to capture a static image or a video. In some embodiments, the electronic device 100 may include one or N cameras 193, where N is a positive integer greater than 1. The video codec is configured to compress or decompress a digital video. The electronic device 100 may support one or more video codecs.

The external memory interface 120 may be configured to connect to an external memory card, for example, a micro SD card, to extend a storage capability of the electronic device 100. The external memory card communicates with the processor 110 through the external memory interface 120, to implement a data storage function. For example, music and videos are stored in the external storage card.

The internal memory 121 may be configured to store computer-executable program code. The executable program code includes instructions. The processor 110 runs the instructions stored in the internal memory 121 to perform various function applications of the electronic device 100 and process data. For example, in this embodiment of this application, the processor 110 may execute the instructions stored in the internal memory 121, to establish the wireless connection to the peripheral device through the wireless communications module 160, and perform short-range data exchange with the peripheral device, to implement functions such as calling and music playing through the peripheral device. The internal memory 121 may include a program storage area and a data storage area. The program storage area may store an operating system, an application required by at least one function (for example, a voice playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS). In this embodiment of this application, after the wireless connection is established between the electronic device 100 and the peripheral device by using the wireless communications technology such as the Bluetooth, the electronic device 100 may store a Bluetooth address of the peripheral device in the internal memory 121. In some embodiments, when the peripheral device is a device including two main bodies, for example, a TWS headset, and left and right earbuds of the TWS headset have respective Bluetooth addresses, the electronic device 100 may store the Bluetooth addresses of the left and right earbuds of the TWS headset in the internal memory 121 in an associated manner.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

In this embodiment of this application, when the wireless connection is established between the electronic device 100 and the peripheral device 101, for example, the TWS headset, the TWS headset may be used as an audio input/output device of the electronic device 100. For example, the audio module 170 may receive an audio electrical signal transmitted by the wireless communications module 160, to implement functions such as call answering and music playing by using the TWS headset. For example, in a process in which the user makes a call, the TWS headset may collect a sound signal of the user, convert the sound signal into an audio electrical signal, and send the audio electrical signal to the wireless communications module 160 of the electronic device 100. The wireless communications module 160 transmits the audio electrical signal to the audio module 170. The audio module 170 may convert the received audio electrical signal into a digital audio signal, encode the digital audio signal, and then transfer an encoded digital audio signal to the mobile communications module 150. The mobile communications module 150 transmits the encoded digital audio signal to a peer device of the call to implement the call. For another example, when the user plays music by using the media player of the electronic device 100, the application processor may transmit, to the audio module 170, an audio electrical signal corresponding to the music played by the media player. The audio module 170 transmits the audio electrical signal to the wireless communications module 160. The wireless communications module 160 may send the audio electrical signal to the TWS headset, so that the TWS headset converts the audio electrical signal into a sound signal for playing.

The headset jack 170D is configured to connect to a wired headset. The headset jack 170D may be the USB interface 130 or a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 180B may be configured to determine a motion posture of the electronic device 100. The gyro sensor 180B may further be used in a navigation scenario and a somatic game scenario. The barometric pressure sensor 180C is configured to measure barometric pressure. The magnetic sensor 180D includes a Hall sensor. The acceleration sensor 180E may detect accelerations in various directions (usually on three axes) of the electronic device 100. The distance sensor 180F is configured to measure a distance. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen. The ambient light sensor 180L is configured to sense ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of the touch event. A visual output related to the touch operation may be provided by using the display 194. In some other embodiments, the touch sensor 180K may alternatively be disposed on a surface of the electronic device 100 at a location different from that of the display 194. The bone conduction sensor 180M may obtain a vibration signal. The bone conduction sensor 180M may also be in contact with a human pulse to receive a blood pressure beating signal. The application processor may parse heart rate information based on the blood pressure beating signal obtained by the bone conduction sensor 180M, to implement a heart rate detection function.

The key 190 includes a power key, a volume key, and the like. The key 190 may be a mechanical key or a touch key. The electronic device 100 may receive a key input, and generate a key signal input related to a user setting and function control of the electronic device 100. The motor 191 may generate a vibration prompt. The motor 191 may be used for an incoming call vibration prompt, or may be used for a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The electronic device 100 interacts with a network through the SIM card, to implement functions such as calling and data communication.

Terms related to the embodiments of this application are described as follows:
1. CIG and CIS A CIG identifier (CIG_ID) is used to identify a CIG. For example, a CIG (1) and a CIG (2) are used to indicate different CIGs. A CIG may include a plurality of CISs. In an ISO channel transmission mechanism, a transmission channel between a source device and each destination device is defined as a CIS. Each destination device corresponds to one CIS. For example, the mobile phone 200 and the left and right earbuds of the TWS headset 201 are used as an example. The mobile phone 200 may configure one CIG for the left and right earbuds of the TWS headset 201, and configure the CIG to include two CISs, for example, a CIS (1) and a CIS (2). The left earbud 201-1 corresponds to the CIS (1), and the right earbud 201-2 corresponds to the CIS (2). Each CIS has a unique CIS identifier (CIS_ID). For example, identifiers of the CIS (1) and the CIS (2) are different. A plurality of CISs in a same CIG share a same CIG synchronization point and CIG presentation point, to implement synchronization of playing audio data by a plurality of peripheral devices.

Figure 4:
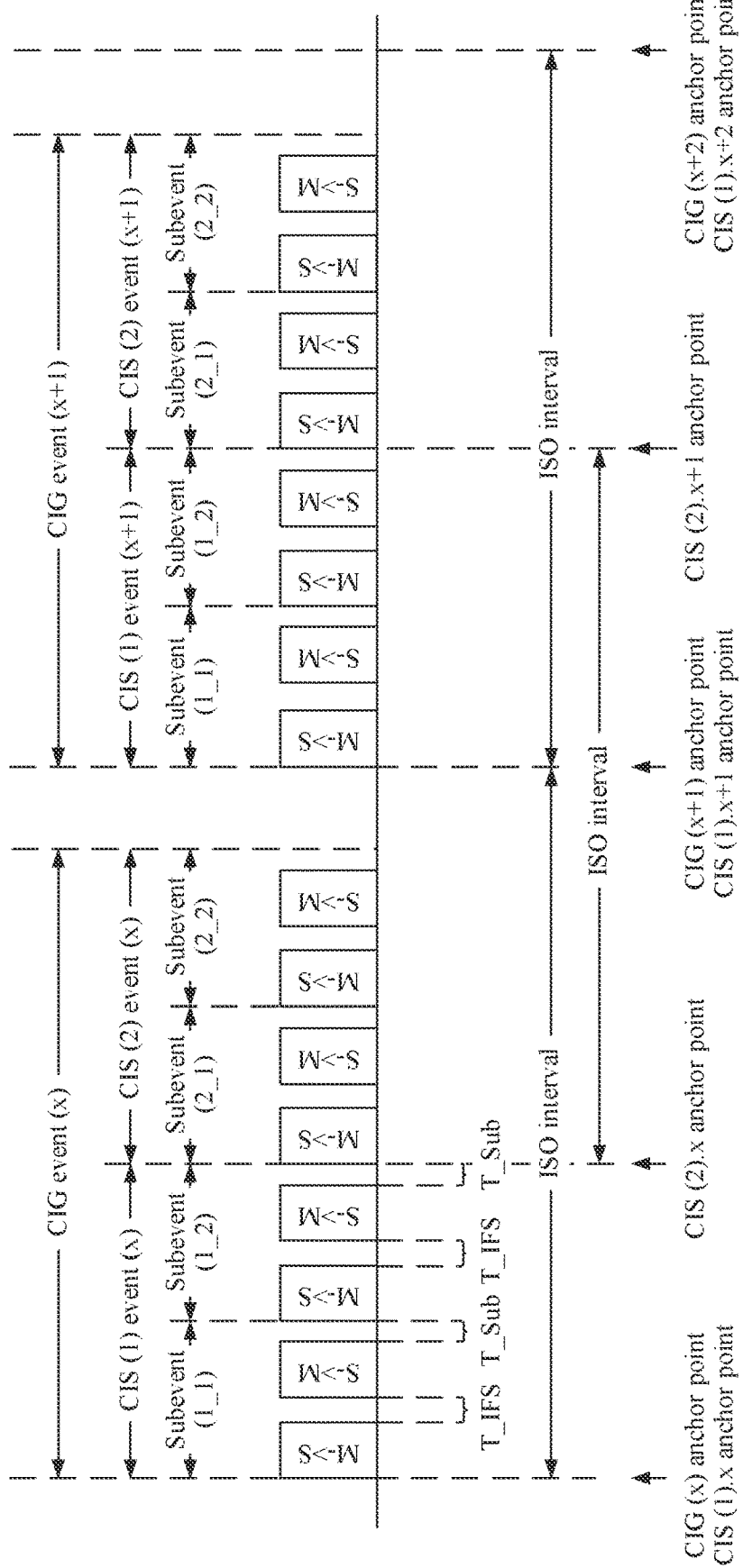
FIG. 4 is a schematic diagram of a CIS transmission principle of an ISO channel according to an embodiment of this application.

A CIG includes a plurality of CIG events (CIG_event). For example, the CIG (1) may include a CIG event (x), a CIG event (x+1), and the like shown in FIG. 4. Each CIG event belongs to one ISO interval (ISO_interval) in terms of time. For example, as shown in FIG. 4, the CIG event (x) belongs to an ISO interval between a CIG (x) anchor point and a CIG (x+1) anchor point in terms of time, and the CIG event (x+1) belongs to an ISO interval between the CIG (x+1) anchor point and a CIG (x+2) anchor point in terms of time. A CIG anchor point is a start time point of a corresponding CIG event. For example, the CIG (x) anchor point is a start time point of the CIG event (x).

Each CIG event may include a plurality of CIS events (CIS_event). For example, as shown in FIG. 4, the CIG event (x) includes a CIS (1) event (x) and a CIS (2) event (x), and the CIG event (x+1) includes a CIS (1) event (x+1) and a CIS (2) event (x+1).

Each CIS may include a plurality of CIS events. For example, the CIS (1) may include the CIS (1) event (x) and the CIS (1) event (x+1) shown in FIG. 4. The CIS (2) may include the CIS (2) event (x) and the CIS (2) event (x+1) shown in FIG. 4.

Each CIS event belongs to one ISO interval in terms of time. For example, as shown in FIG. 4, the CIS (1) event (x) belongs to an ISO interval between a CIS (1).x anchor point and a CIS (1).x+1 anchor point in terms of time; the CIS (2) event (x) belongs to an ISO interval between a CIS (2).x anchor point and a CIS (2).x+1 anchor point in terms of time; and the CIS (1) event (x+1) belongs to an ISO interval between the CIS (1).x+1 anchor point and the CIS (1).x+1 anchor point in terms of time.

An ISO interval is a time period between two consecutive CIS anchor points. The two consecutive CIS anchor points are two consecutive anchor points of a same CIS. For example, the CIS (1).x anchor point and the CIS (1).x+1 anchor point are two consecutive anchor points of the CIS (1). A CIS anchor point is a start time point of a corresponding CIS event. For example, the CIS (1).x anchor point is a start time point of the CIS (1) event (x).

2. Subevent (Sub_Event)

Each CIS can define a number of subevents (number of subevents, NSE) within one ISO interval. In other words, each CIS event includes NSE subevents. A value of the NSE is greater than or equal to 1. For example, as shown in any one of FIG. 4, FIG. 7A, FIG. 8, or FIG. 9A, the NSE=2. The CIS (1) event (x) includes a subevent (1_1) and a subevent (1_2), and the CIS (2) event (x) includes a subevent (2_1) and a subevent (2_2).

As shown in FIG. 4, each subevent includes one "M→S" and one "S→M". "M→S" is used by the source device to send audio data to the destination device and used by the destination device to receive the audio data sent by the source device. "S→M" is used by the destination device to send audio data to the source device and used by the source device to receive the audio data sent by the destination device.

For example, "M→S" in the CIS (1) is used by the mobile phone 200 to send audio data to the left earbud 201-1 and used by the left earbud 201-1 to receive the audio data sent by the mobile phone 200. "S→M" in the CIS (1) is used by the left earbud 201-1 to send data (such as audio data or feedback information) to the mobile phone 200 and used by the mobile phone 200 to receive the data sent by the left earbud 201-1. "M→S" in the CIS (2) is used by the mobile phone 200 of an electronic device 1 to send audio data to the right earbud 201-2 and used by the right earbud 201-2 to receive the audio data sent by the mobile phone 200. "S→M" in the CIS (2) is used by the right earbud 201-2 to send data (such as audio data or feedback information) to the mobile phone 200 and used by the mobile phone 200 to receive the data sent by the right earbud 201-2. The feedback information may be an acknowledgment (acknowledgement, ACK) or a negative acknowledgment (negative acknowledgment, NACK).

Duration (Sub_event duration) of a subevent (Sub_event) is T. As shown in FIG. 4, duration of the subevent (1_1) is T=T(M→S)+TIFS+T(S→M)+T_Sub.

T(M→S) is duration of "M→S". T(S→M) is duration of "S→M". T_IFS indicates an interval between "M→S" and "S→M" in a same subevent. T_Sub is an interval between "S→M" and "M→S" that is in a next subevent. T_Sub is greater than or equal to T_MSS, and T_MSS=150 microseconds.

Each subevent (Sub_event) belongs to one sub-interval (Sub interval) in terms of time. A sub-interval of a CIS event may be a time period between a start time point of a subevent and a start time point of a next subevent in the same CIS event. For example, as shown in any one of FIG. 7A, FIG. 8, or FIG. 9A, a sub-interval (namely, a CIS (1)_sub-interval) of the CIS (1) may be a time period between a start time point of the subevent (1_1) and a start time point of the subevent (1_2) in the CIS (1) event (x). A sub-interval (namely, CIS (2)_sub-interval) of the CIS (2) may be a time period between a start time point of the subevent (2_1) and a start time point of the subevent (2_2) in the CIS (2) event (x).

It should be noted that, when the ISO interval is fixed, a larger NSE indicates more subevents (Sub_event) included in one ISO interval, more data packets transmitted in the ISO interval, and a higher duty cycle of the ISO channel. The mobile phone 200 may determine the NSE based on a requirement of an audio service on a duty cycle of the ISO channel.

3. Burst Number (Burst Number, BN) and Flush Timeout (Flush Timeout, FT)

The BN is a quantity of new payloads (namely, data packets) that can be transmitted in a CIS event. In other words, the BN may indicate a maximum quantity of different payloads that can be transmitted in one CIS event. A BN(M→S) is a quantity of new payloads that can be transmitted by the source device (for example, the mobile phone 200) to the destination device (for example, the right earbud 201-2) in a CIS event. A BN(S→M) is a quantity of new payloads that can be transmitted by the destination device to the source device in a CIS event. The NSE is greater than the BN.

The FT may indicate a maximum time period in which one payload can be transmitted or retransmitted. In other words, the FT may indicate a maximum quantity of ISO intervals at which one payload can be transmitted. An FT(M→S) is a maximum time period in which one payload can be transmitted or retransmitted when the source device transmits data to the destination device. An FT(S→M) is a maximum time period in which one payload can be transmitted or retransmitted when the destination device transmits data to the source device.

The BSE, the BN, and the FT may be used to indicate a retransmission policy of a payload (namely, a data packet) in the ISO channel. In this embodiment of this application, an example in which a BN and an FT shown in FIG. 5A, FIG. 5B, or FIG. 5C are respectively the BN(M→S) and the FT(M→S) is used herein to describe the BN and the FT.

Figure 5A:
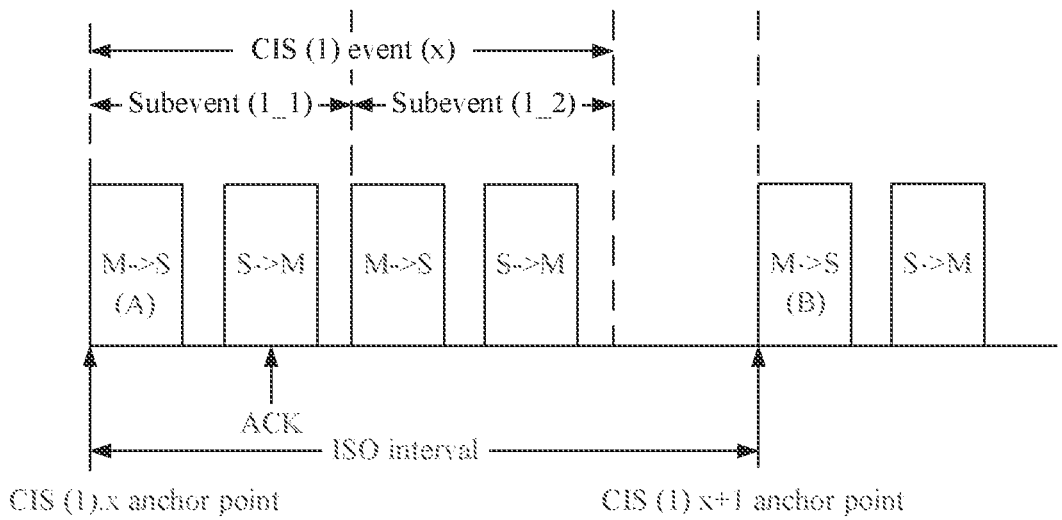
FIG. 5A is a schematic diagram 1 of a CIS retransmission principle according to an embodiment of this application.

As shown in FIG. 5A, the NSE=2, and the BN=1. The mobile phone 200 sends a data packet (A) to the left earbud 201-1 in "M→S" in the subevent (1_1). The left earbud 201-1 receives the data packet (A) in "M→S" in the subevent (1_1). It is assumed that the left earbud 201-1 successfully receives the data packet (A). In this case, the left earbud 201-1 may feed back an ACK to the mobile phone 200 in "S→M" in the subevent (1_1). The mobile phone may receive, in "S→M" in the subevent (1_1), the ACK fed back by the left earbud 201-1. The BN being equal to 1 means that a maximum of one different payload (namely, one data packet) may be transmitted in one CIS event. Therefore, the mobile phone 200 has successfully transmitted the data packet (A) to the left earbud 201-1 in the CIS (1) event (x). Even if "M→S" in the subevent (1_2) may further be used by the mobile phone 200 to transmit a data packet to the left earbud 201-1, the mobile phone 200 does not continue to transmit another data packet to the left earbud 201-1 in "M→S" in the subevent (1_2). Certainly, if the BN>1, for example, the BN=2, the mobile phone 200 may further transmit another data packet to the left earbud 201-1 in "M→S" in the subevent (1_2).

Figure 5B:
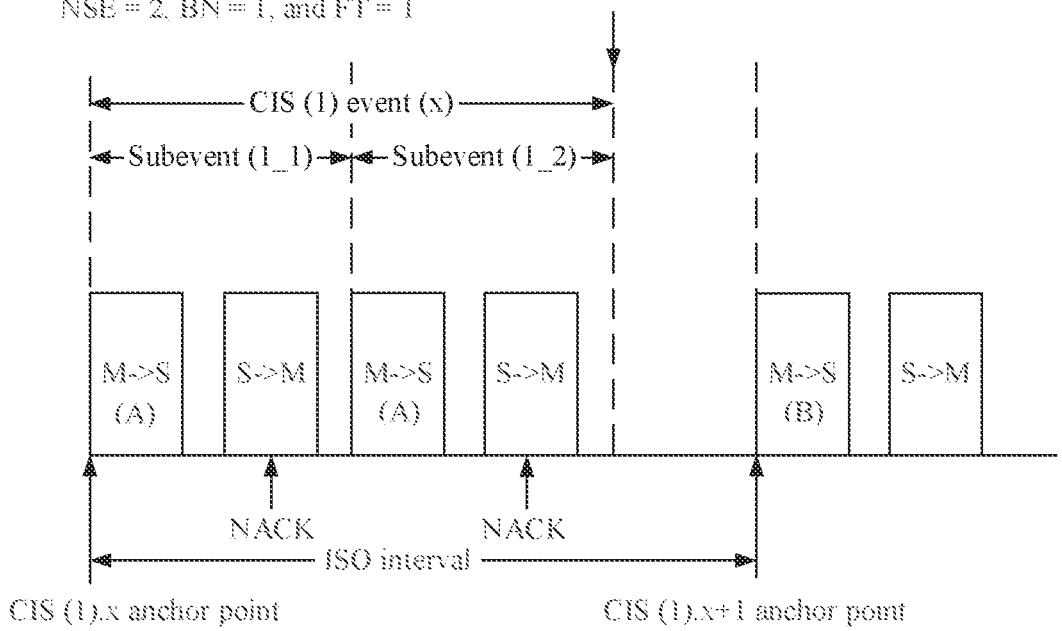
FIG. 5B is a schematic diagram 2 of a CIS retransmission principle according to an embodiment of this application.
Figure 5C:
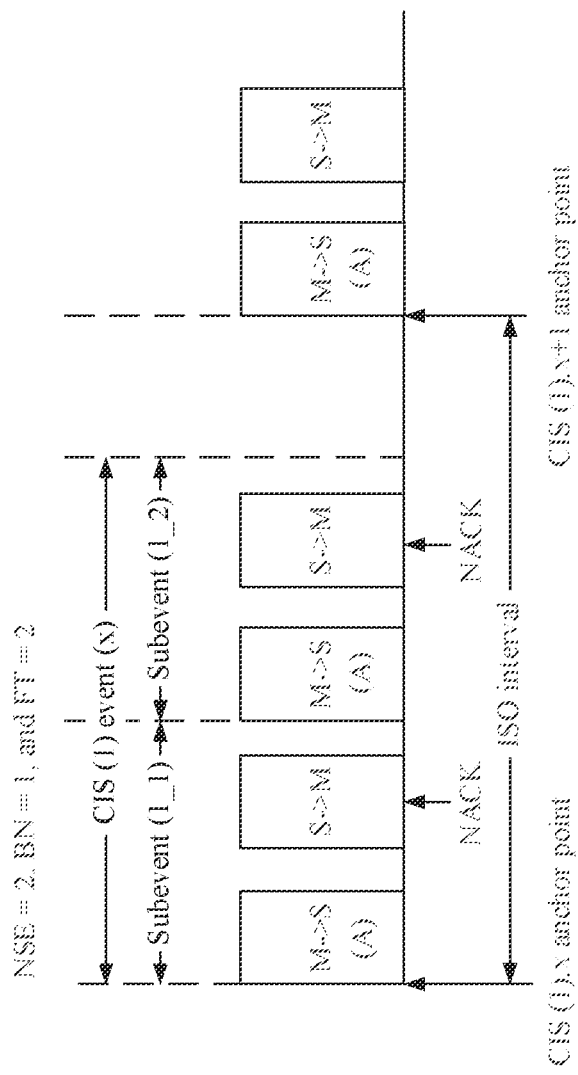
FIG. 5C is a schematic diagram 3 of a CIS retransmission principle according to an embodiment of this application.

As shown in FIG. 5B, the NSE=2, the BN=1, and the FT=1. The mobile phone 200 sends the data packet (A) to the left earbud 201-1 in "M→S" in the subevent (1_1). If the left earbud 201-1 fails to receive the data packet (A) in "M→S" in the subevent (1_1), the left earbud 201-1 may feed back a NACK to the mobile phone 200 in "S→M" in the subevent (1_1). After receiving the NACK fed back by the left earbud 201-1 in "S→M" in the subevent (1_1), the mobile phone may retransmit the data packet (A) to the left earbud 201-1 in "M→S" in the subevent (1_2). If the left earbud 201-1 fails to receive the data packet (A) in "M→S" in the subevent (1_2), the left earbud 201-1 may feed back a NACK to the mobile phone 200 in "S→M" in the subevent (1_2). The FT being equal to 1 means that a maximum time period in which one payload (namely, one data packet) can be transmitted or retransmitted is one ISO interval. In other words, even if the left earbud 201-1 fails to receive the data packet (A), the mobile phone 200 cannot retransmit the data packet (A) again in a next ISO interval. As shown in FIG. 5B, the NSE=2, and the CIS (1) event (x) includes only two subevents. Therefore, an end point of the sub-vent (1_2) is a clearing point of the data packet (A). For example, in "M→S" starting from the CIS (1).x+1 anchor point, the mobile phone 200 no longer retransmits the data packet (A), but transmits a new data packet (B).

However, if the FT>1, for example, the FT=2, the mobile phone 200 may continue to retransmit the data packet (A) at the next ISO interval. For example, as shown in FIG. 5C, the NSE=2, the BN=1, and the FT=2. The mobile phone 200 continues to retransmit the data packet (A) in "M→S" that starts from the CIS (1).x+1 anchor point.

4. CIS Synchronization Delay (CIS_Synchronization Delay)

The CIS synchronization delay is duration between a CIS anchor point and the CIG synchronization point. For example, as shown in any one of FIG. 7A, FIG. 8, or FIG. 9A, a CIS (1) synchronization delay is duration between the CIS (1).x anchor point and the CIG synchronization point, and a CIS (2) synchronization delay is duration between the CIS (2).x anchor point and the CIG synchronization point.

5. CIG Synchronization Delay (CIG_Synchronization Delay)

The CIG synchronization delay is duration between a CIG anchor point and the CIG synchronization point. As shown in any one of FIG. 7A, FIG. 8, or FIG. 9A, the CIG synchronization delay is duration between the CIG (x) anchor point and the CIG synchronization point.

6. CIG Presentation Delay (CIG_Presentation Delay)

Figure 7A:
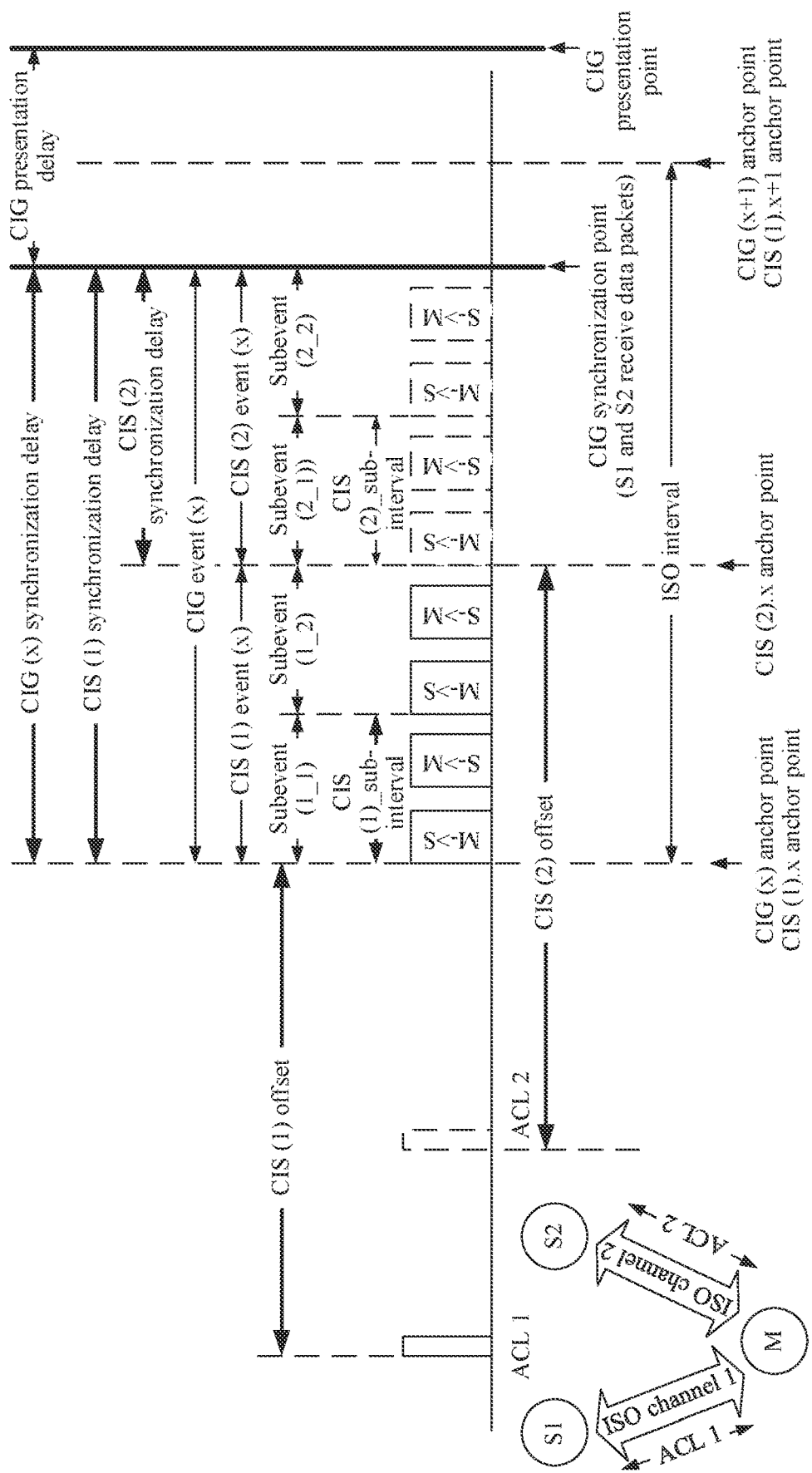
FIG. 7A is a schematic diagram 1 of a principle of a serial scheduling transmission manner according to an embodiment of this application.
Figure 8:
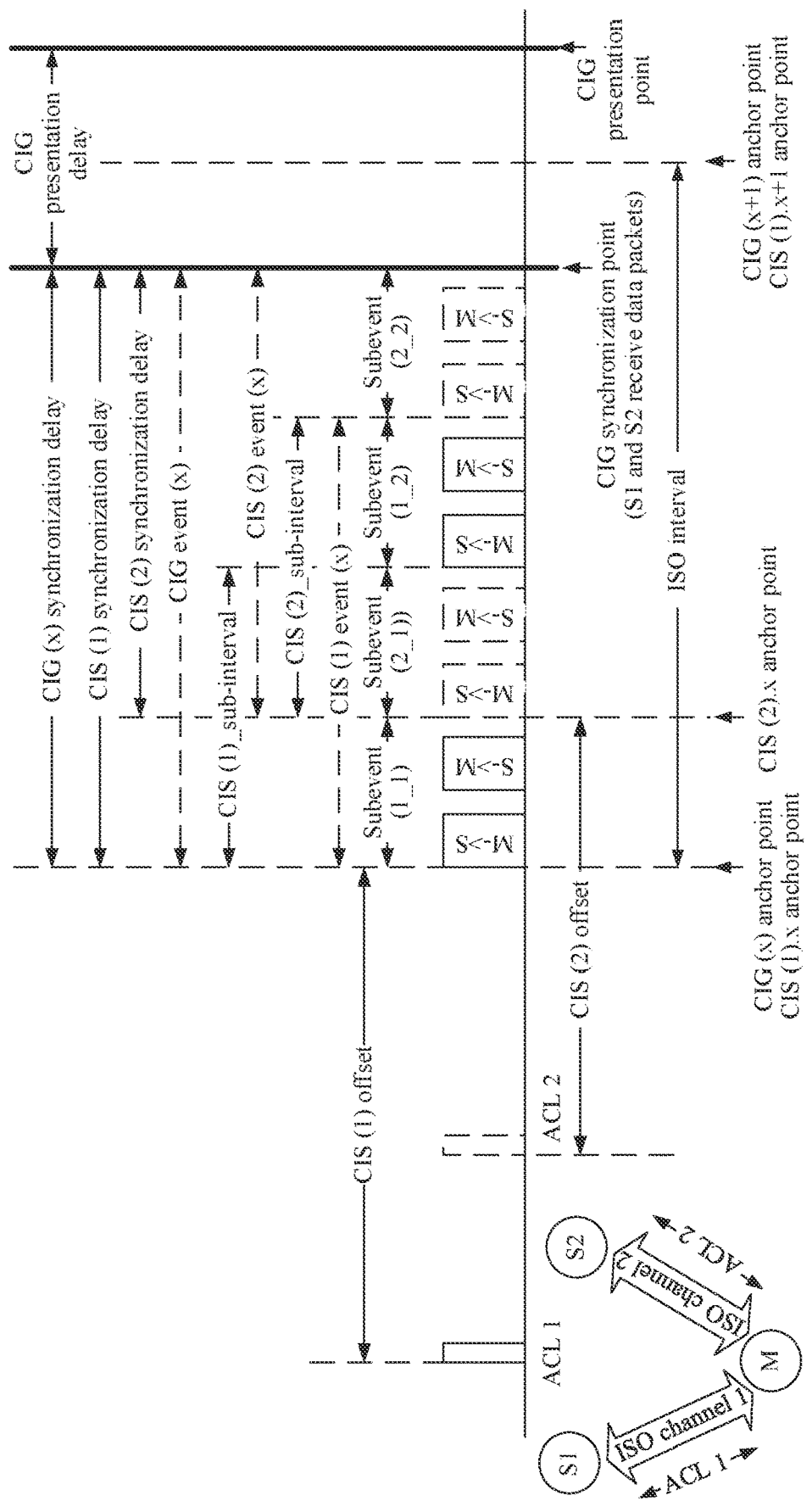
FIG. 8 is a schematic diagram 1 of a principle of an interleaved scheduling transmission manner according to an embodiment of this application.
Figure 9A:
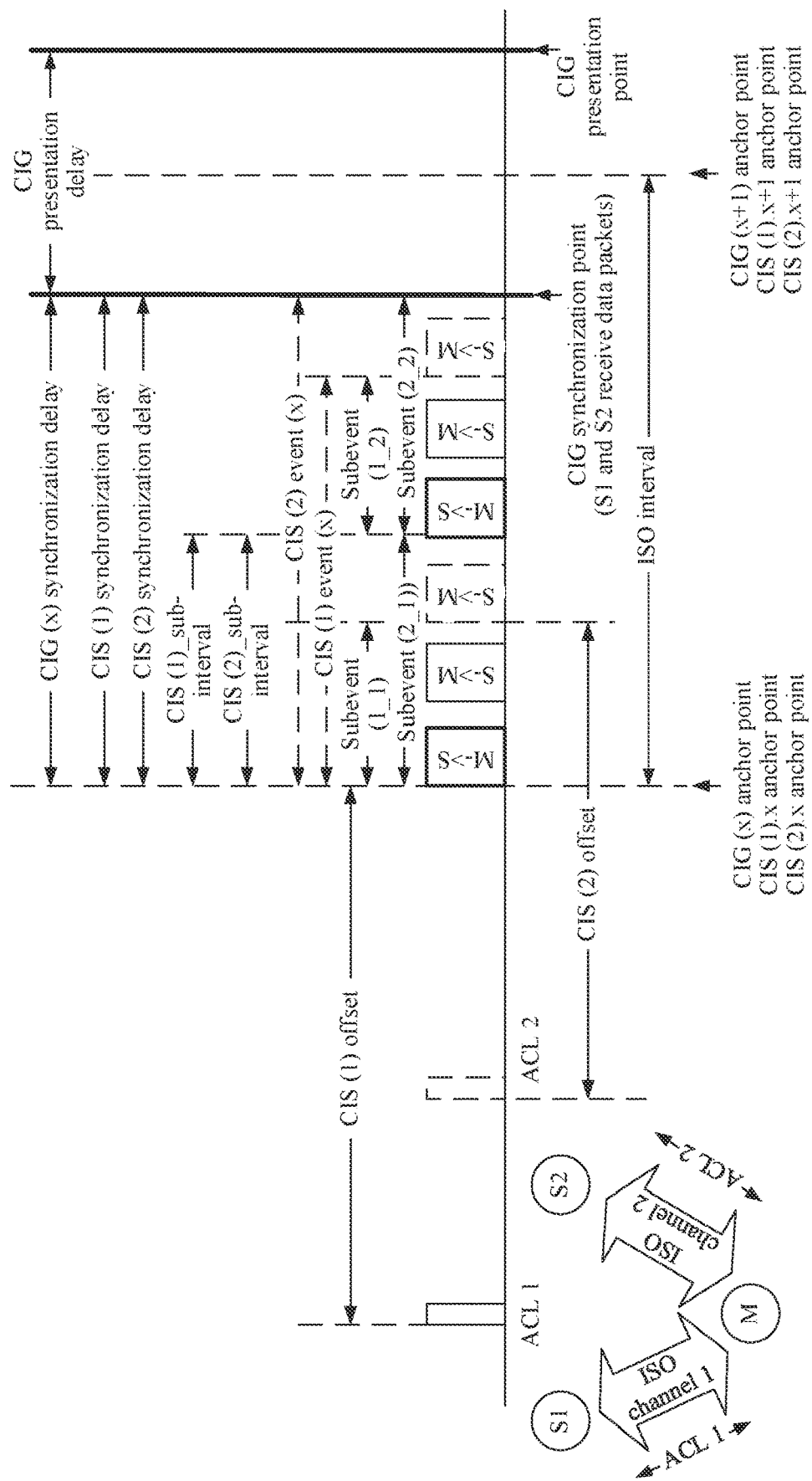
FIG. 9A is a schematic diagram 1 of a principle of a joint scheduling transmission manner according to an embodiment of this application.

As shown in any one of FIG. 7A, FIG. 8, or FIG. 9A, the CIG presentation delay is duration between the CIG synchronization point and the CIG presentation point.

At the CIG synchronization point, both the left earbud 201-1 corresponding to the CIS (1) and the right earbud 201-2 corresponding to the CIS (2) receive audio data. After receiving the audio data at the CIG synchronization point, the left earbud 201-1 and the right earbud 201-2 may simultaneously play the received audio data at the CIG presentation point, to implement synchronous playing of audio streams of the left earbud 201-1 and the right earbud 201-2.

For ease of understanding, the following describes in detail the point-to-multipoint data transmission method provided in the embodiments of this application with reference to the accompanying drawings. In the following embodiments, an example in which the electronic device 100 is the mobile phone 200 shown in FIG. 1B, the peripheral device 101 is the TWS headset 201, and the TWS headset 201 includes the left earbud 201-1 and the right earbud 201-2 is used for description.

Figure 6A:
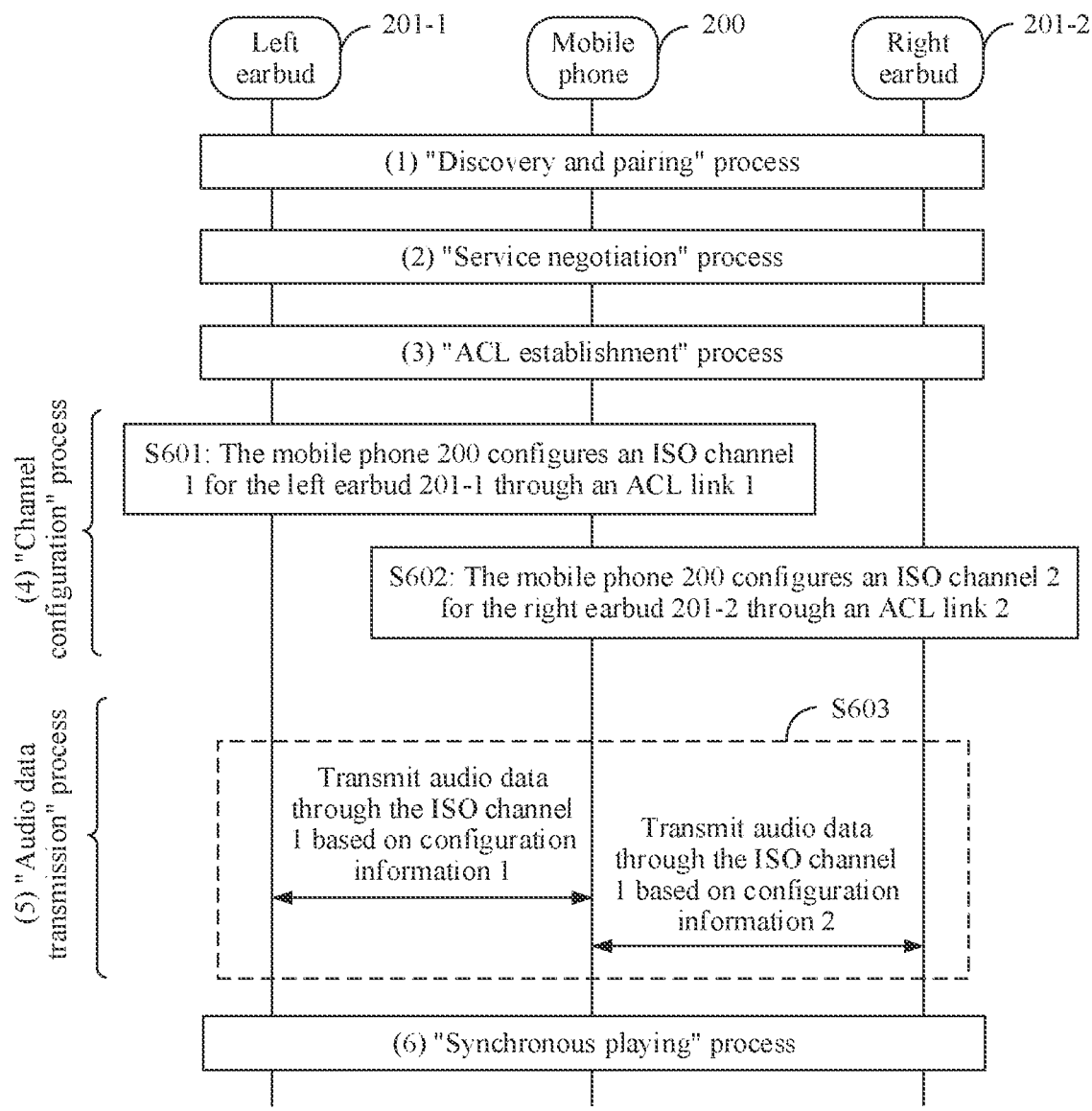
FIG. 6A is a flowchart 1 of a point-to-multipoint data transmission method according to an embodiment of this application.

As shown in FIG. 6A, the method in the embodiments of this application may include: (1) a "discovery and pairing" process; (2) a "service negotiation" process; (3) an "ACL establishment" process; (4) a "channel configuration" process; (5) an "audio data transmission" process; and (6) a "synchronous playing" process.

(1) The "Discovery and Pairing" Process

When a user wants to use the TWS headset 201, the user may open the cover of the earbud box of the TWS headset 201. In this case, either (for example, the right earbud 201-2) of the left earbud 201-1 and the right earbud 201-2 may send a pairing broadcast to the outside. If a Bluetooth function of the mobile phone 200 has been enabled, the mobile phone 200 may receive the pairing broadcast and prompt the user that a related Bluetooth device (for example, the right earbud 201-2) has been scanned. After the user selects the right earbud 201-2 on the mobile phone 200 as a connection device, the mobile phone 200 may be paired with the right earbud 201-2.

When the cover of the earbud box of the TWS headset 201 is opened, the left earbud 201-1 and the right earbud 201-2 may be automatically paired with and connected to the mobile phone 200. After the right earbud 201-2 is paired with the mobile phone 200, the right earbud 201-2 may send a Bluetooth address of the mobile phone 200 to the left earbud 201-1 through a Bluetooth connection between the right earbud 201-2 and the left earbud 201-1, and indicate the left earbud 201-1 to send a pairing broadcast to the outside. In this way, the mobile phone 200 may receive the pairing broadcast sent by the left earbud 201-1, and perform pairing with the left earbud 201-1.

The right earbud 201-2 may further send a MAC address of the left earbud 201-1 to the mobile phone 200, to indicate, to the mobile phone 200, that the right earbud 201-2 and the left earbud 201-1 are two main bodies of a same peripheral device (for example, the TWS headset 201). In this way, the mobile phone 200 may configure two CISs in a same CIG for the right earbud 201-2 and the left earbud 201-1, and separately perform audio data transmission with the right earbud 201-2 and the left earbud 201-1 through the two CISs. In this way, the right earbud 201-2 and the left earbud 201-1 can synchronously play audio data.

(2) The "Service Negotiation" Process

After being paired with the left earbud 201-1 and the right earbud 201-2, the mobile phone 200 may separately negotiate service content with the left earbud 201-1 and the right earbud 201-2.

An example in which the mobile phone 200 negotiates the service content with the left earbud 201-1 is used. The mobile phone 200 may send a service discovery protocol (Service Discovery Protocol, SDP) service request to the left earbud 201-1, to obtain a service type supported by the left earbud 201-1. After receiving the SDP service request, the left earbud 201-1 returns the service type supported by the left earbud 201-1 to the mobile phone 200. For example, in this embodiment of this application, the mobile phone 200, the left earbud 201-1, and the right earbud 201-2 may support dually-transmitted audio profiles such as a hands free profile (Hands Free Profile, HFP), an advanced audio distribution profile (Advanced Audio Distribution Profile, A2DP), and an audio/video remote control profile (Audio/Video Remote Control Profile, AVRCP). In this embodiment of this application, based on these dually-transmitted audio profiles, point-to-multipoint audio data transmission between the mobile phone 200 and the left and right earbuds of the TWS headset 201 can be implemented.

It should be noted that, the audio data in this embodiment of this application may include: when the left and right earbuds of the TWS headset 201 are used as audio input/output devices of the mobile phone 200, voice data in a call process of the mobile phone 2200 by using a "Phone" application, voice data in a voice communication or video communication process of the mobile phone 200 by using a third-party application (such as WeChat), audio data in a music playing process of the mobile phone 200 by using a music player, a prompt tone of the mobile phone 200, and the like.

(3) The "ACL Establishment" Process

After the mobile phone 200 is paired with the left earbud 201-1 and the right earbud 201-2, the mobile phone 200 may separately establish an ACL link with the left earbud 201-1 and the right earbud 201-2. For example, as shown in FIG. 1B, the mobile phone 200 may establish the ACL link 1 with the left earbud 201-1, and the mobile phone 200 may establish the ACL link 2 with the right earbud 201-2. An example in which the mobile phone 200 establishes the ACL link 1 with the left earbud 201-1 is used. The mobile phone 200 may send an ACL link establishment request to the left earbud 201-1. The left earbud 201-1 makes a response after receiving the ACL link establishment request. After the mobile phone 200 receives the response from the left earbud 201-1, the ACL link 1 is successfully established. A specific method for establishing an ACL link between two Bluetooth devices (for example, the mobile phone 200 and the left earbud 201-1) is not described herein in this embodiment of this application.

(4) The "Channel Configuration" Process

The mobile phone 200 may configure separate ISO channels between the mobile phone 200 and the left and right earbuds of the TWS headset 201 through the ACL links between the mobile phone 200 and the left and right earbuds of the TWS headset 201. For example, the mobile phone 200 may configure the ISO channel 1 between the mobile phone 200 and the left earbud 201-1 through the ACL link 1, and configure the ISO channel 2 between the mobile phone 200 and the right earbud 201-2 through the ACL link 2.

After the ISO channels between the mobile phone 200 and the left and right earbuds of the TWS headset 201 are configured, based on a negotiated profile and the configured ISO channels, the point-to-multipoint audio data transmission between the mobile phone 200 and the left and right earbuds of the TWS headset 201 is implemented, and the right earbud 201-2 and the left earbud 201-1 can synchronously play the audio data.

Specifically, as shown in FIG. 6A, the "channel configuration" procedure may include S601 and S602.

S601: The mobile phone 200 configures the ISO channel 1 for the left earbud 201-1 through the ACL link 1.

The mobile phone 200 may negotiate configuration information about the ISO channel 1 (configuration information 1 for short) with the left earbud 201-1 through the ACL link 1, to configure the ISO channel 1. The mobile phone 200 performs audio data transmission with the left earbud 201-1 and the right earbud 201-2 in a TDMA manner. The configuration information 1 may be used to determine a time point at which the left earbud 201-1 receives the audio data on the ISO channel 1, a time point at which the left earbud 201-1 sends data (for example, audio data and/or feedback information) on the ISO channel 1, and a time point (for example, the CIG presentation point) at which the left earbud 201-1 plays the audio data. After determining the time points, the left earbud 201-1 may perform audio data sending, receiving, and playing based on the time points.

For example, the configuration information 1 may include the following parameters:

An identifier of the CIG (namely, a first CIG) allocated by the mobile phone 200 to the left earbud 201-1 and the right earbud 201-2: For example, the identifier of the first CIG may be a CIG (1) shown in Table 1.

An identifier of a CIS (1) (namely, a first CIS) allocated by the mobile phone 200 to the left earbud 201-1: For example, as shown in Table 1, the identifier of the CIS (1) may be CIS-1.

A payload parameter (M→S) (namely, a first payload parameter), namely, Payload_M→S: Payload_M→S is used to indicate a size of data that can be transmitted in "M→S". For example, as shown in Table 1, Payload_M→S may be a.

A payload parameter (S→M) (namely, a second payload parameter), namely, Payload_S→M: Payload_S→M is used to indicate a size of data that can be transmitted in "S→M". For example, as shown in Table 1, Payload_S→M may be b.

An NSE (namely, N1): For example, as shown in Table 1, the NSE configured by the mobile phone 200 for the left earbud 201-1 may be equal to 2.

An ISO interval: For example, as shown in Table 1, the ISO interval may be T_ISO.

A CIS_sub-interval (namely, a first sub-interval): A CIS_sub-interval indicated by the mobile phone 200 to the left earbud 201-1 is a CIS_sub-interval of the CIS (1), namely, a CIS (1)_sub-interval. For example, as shown in Table 1, the CIS (1)_sub-interval may be T_S(1).

A BN(M→S), a BN(S→M), an FT(M→S), and an FT(S→M): The BN(M→S), the BN(S→M), the FT(M→S), and the FT(S→M) configured by the mobile phone 200 for the ISO channel 1 may be collectively referred to as first retransmission parameters. The first retransmission parameter and a first NSE may be used to indicate a retransmission policy of a payload (namely, a data packet) on the ISO channel 1, The BN(M→S) and the BN(S→M) configured by the mobile phone 200 for the ISO channel 1 may be the same or may be different. The FT(M→S) and the FT(S→M) configured by the mobile phone 200 for the ISO channel 1 may be the same or may be different. In this embodiment of this application, an example in which the BN(M→S) and the BN(S→M) are the same, and the FT (M→S) and the FT(S→M) are the same is used. For example, as shown in Table 1, the BN(M→S) and the BN(S→M) configured by the mobile phone 200 for the ISO channel 1 may be BN_(1), and the FT(M→S) and the FT(S→M) may be FT_(1).

A CIS synchronization delay (namely, a first synchronization delay) and a CIG presentation delay: The CIS synchronization delay indicated by the mobile phone 200 to the left earbud 201-1 is a CIS synchronization delay of the CIS (1), namely, a CIS (1) synchronization delay. For example, as shown in Table 1, the CIS (1) synchronization delay may be a T_CIS (1) delay, and the CIG presentation delay may be a T_CIG delay.

Duration T(M→S) of "M→S", duration T(S→M) of "M→S", and other duration T_IFS and T_Sub: T(M→S) and T(S→M) may be the same or different. A time parameter (namely, a first time parameter) used to determine a CIS anchor point:

The time parameter, indicated by the mobile phone 200 to the left earbud 201-1, that is used to determine a CIS anchor point is a time parameter used to determine a CIS (1) anchor point (for example, a CIS (1).x anchor point). For example, as shown in Table 1, the time parameter used to determine the CIS (1) anchor point may be a time parameter P.

TABLE 1

| Configuration information 1 | |
|---|---|
| CIG identifier | CIG (1) |
| CIS identifier | CIS-1 |
| Payload_M -> S | a |
| Payload_S -> M | b |
| NSE | 2 |
| ISO interval | T_ISO |
| CIS_sub-interval | T_S(1) |
| BN(M -> S) | BN_(1) |
| BN(S -> M) | BN_(1) |
| FT(M -> S) | FT_(1) |
| FT(S -> M) | FT_(1) |
| CIS synchronization delay | T_CIS (1) delay |
| CIG presentation delay | T_CIG delay |
| M -> S duration | T(M -> S) |
| S -> M duration | T(S -> M) |
| Other duration 1 | T_IFS |
| Other duration 2 | T_Sub |
| Time parameter used to determine a CIS anchor point | Time parameter P |

It should be noted that Table 1 merely provides a specific example of the configuration information 1. The configuration information 1 includes but is not limited to the parameters shown in Table 1. In addition, some parameters in Table 1 are optional. For example, the other duration 2 (for example, T_Sub) is optional.

S602: The mobile phone 200 configures the ISO channel 2 for the right earbud 201-2 through the ACL link 2.

The mobile phone 200 may negotiate configuration information about the ISO channel 2 (configuration information 2 for short) with the right earbud 201-2 through the ACL link 2, to configure the ISO channel 2. The mobile phone 200 performs audio data transmission with the left earbud 201-1 and the right earbud 201-2 in the TDMA manner. The configuration information 2 may be used to determine a time point at which the right earbud 201-2 receives the audio data on the ISO channel 2, a time point at which the right earbud 201-2 sends data (for example, audio data and/or feedback information) on the ISO channel 2, and a time point (namely, the CIG presentation point) at which the right earbud 201-2 plays the audio data. After determining the time points, the right earbud 201-2 may perform audio data sending, receiving, and playing based on the time points.

It should be noted that the time point, determined by the configuration information 1, at which the left earbud 201-1 plays the audio data is the same as the time point (namely, the CIG presentation point), determined by the configuration information 2, at which the right earbud 201-2 plays the audio data. In this way, the left earbud 201-1 and the right earbud 201-2 can synchronously play the audio data. The audio data simultaneously played by the left earbud 201-1 and the right earbud 201-2 is the same audio data.

For example, the configuration information 2 may include the following parameters:

The identifier of the CIG (namely, the first CIG) allocated by the mobile phone 200 to the left earbud 201-1 and the right earbud 201-2: For example, a CIG (1) shown in Table 2. The mobile phone 200 may allocate a same CIG to the left earbud 201-1 and the right earbud 201-2. In other words, the CIG identifier shown in Table 1 is the same as the CIG identifier shown in Table 2.

An identifier of a CIS (2) (namely, a second CIS) allocated by the mobile phone 200 to the right earbud 201-2: For example, as shown in Table 2, the identifier of the CIS (2) may be CIS-2.

Payload_M→S (namely, a third payload parameter): Payload_M→S is used to indicate a size of data that can be transmitted in "M→S". Payload_M→S configured by the mobile phone 200 for the left earbud 201-1 may be the same as or different from Payload_M→S indicated by the mobile phone 200 for the right earbud 201-2. In this embodiment of this application, an example in which the mobile phone 200 configures the same Payload_M→S for the left earbud 201-1 and the right earbud 201-2 is used. For example, as shown in Table 2, Payload_M→S may be a.

Payload_S→M (namely, a fourth payload parameter): Payload_S→M is used to indicate a size of data that can be transmitted in "S→M". Payload_S→M configured by the mobile phone 200 for the left earbud 201-1 may be the same as or different from Payload_S→M indicated by the mobile phone 200 for the right earbud 201-2. In this embodiment of this application, an example in which the mobile phone 200 configures the same Payload_S→M for the left earbud 201-1 and the right earbud 201-2 is used. For example, as shown in Table 2, Payload_S→M may be b.

An NSE (namely, N2): The NSE (namely, the first NSE) configured by the mobile phone 200 for the CIS (1) may be the same as or different from the NSE (namely, a second NSE) configured by the mobile phone 200 for the CIS (2). In this embodiment of this application, an example in which the mobile phone 200 configures the same NSE for the left earbud 201-1 and the right earbud 201-2 is used. For example, as shown in Table 2, the NSE configured by the mobile phone 200 for the right earbud 201-2 may be equal to 2.

An ISO interval: The ISO interval in the configuration information 2 is the same as the ISO interval in the configuration information 1. For example, as shown in Table 2, the ISO interval may be T_ISO.

A CIS_sub-interval (namely, a second sub-interval): The CIS_sub-interval indicated by the mobile phone 200 to the right earbud 201-2 is a CIS_sub-interval of the CIS (2), namely, a CIS (2)_sub-interval. For example, as shown in Table 2, the CIS (2)_sub-interval may be T_S(2).

It should be noted that the CIS (1)_sub-interval may be the same as or different from the CIS (2)_sub-interval. For example, in a serial scheduling transmission manner shown in FIG. 7A, the CIS (1)_sub-interval is the same as the CIS (2)_sub-interval. In an interleaved scheduling transmission manner shown in FIG. 8, the CIS (1)_sub-interval is different from the CIS (2)_sub-interval. In addition, in different transmission manners, a same CIS has different sub-intervals. For example, the CIS (1)_sub-interval shown in FIG. 7A is different from the CIS (1)_sub-interval shown in FIG. 8. For the transmission manners of serial scheduling and interleaved scheduling, refer to detailed descriptions of the (5) "audio data transmission" process in this embodiment of this application. Details are not described herein again in this embodiment of this application.

A BN(M→S), a BN(S→M), an FT(M→S), and an FT(S→M): The BN(M→S), the BN(S→M), the FT(M→S), and the FT(S→M) configured by the mobile phone 200 for the ISO channel 2 may be collectively referred to as second retransmission parameters. The second retransmission parameter and the second NSE may be used to indicate a retransmission policy of a payload (namely, a data packet) on the ISO channel 2. A BN configured by the mobile phone 200 for the ISO channel 2 may be the same as or different from a BN configured by the mobile phone 200 for the ISO channel 1. An FT configured by the mobile phone 200 for the ISO channel 2 may be the same as or different from an FT configured by the mobile phone 200 for the ISO channel 1. In addition, the BN(M→S) and the BN(S→M) configured by the mobile phone 200 for the ISO channel 2 may be the same or may be different. The FT(M→S) and the FT(S→M) configured by the mobile phone 200 for the ISO channel 1 may be the same or may be different. In this embodiment of this application, an example in which the mobile phone 200 configures the same BN(M→S), BN(S→M), FT(M→S), and FT(S→M) for the ISO channel 2 and the ISO channel 1, the BN(M→S) is the same as the BN(S→M), and the FT(M→S) is the same as the FT(S→M) is used. For example, as shown in Table 2, the BN(M→S) and the BN(S→M) configured by the mobile phone 200 for the ISO channel 2 may be BN_(1), and the FT(M→S) and the FT(S→M) may be FT_(1).

A CIS synchronization delay (namely, a second synchronization delay) and a CIG presentation delay: The CIS synchronization delay indicated by the mobile phone 200 to the right earbud 201-2 is a CIS synchronization delay of the CIS (2), namely, a CIS (2) synchronization delay. For example, as shown in Table 2, the CIS (2) synchronization delay may be a T_CIS (2) delay, and the CIG presentation delay may be a T_CIG delay.

Duration T(M→S) of "M→S", duration T(S→M) of "M→S", and other duration T_IFS and T_Sub: T(M→S) and T(S→M) may be the same or different.

A time parameter (namely, a second time parameter) used to determine a CIS anchor point: The time parameter, indicated by the mobile phone 200 to the right earbud 201-2, that is used to determine a CIS anchor point is a time parameter used to determine a CIS (2) anchor point (for example, a CIS (2).x anchor point). For example, as shown in Table 2, the time parameter used to determine the CIS (2) anchor point may be a time parameter Q.

TABLE 2

| Configuration information 2 | |
| --- | --- |
| CIG identifier | CIG (1) |
| CIS identifier | CIS-2 |
| Payload_M -> S | a |
| Payload_S -> M | b |
| NSE | 2 |
| ISO interval | T_ISO |
| CIS_sub-interval | T_S(2) |
| BN(M -> S) | BN_(1) |
| BN(S -> M) | BN_(1) |
| FT(M -> S) | FT_(1) |
| FT(S -> M) | FT_(1) |
| CIS synchronization delay | T_CIS (2) delay |
| CIG presentation delay | T_CIG delay |
| M -> S duration | T(M -> S) |
| S -> M duration | T(S -> M) |
| Other duration 1 | T_IFS |
| Other duration 2 | T_Sub |
| Time parameter used to determine a CIS anchor point | Time parameter Q |

It should be noted that Table 2 merely provides a specific example of the configuration information 2. The configuration information 2 includes but is not limited to the parameters shown in Table 2. In addition, some parameters in Table 2 are optional. For example, the other duration 2 (for example, T_Sub) is optional.

For example, a CIS configuration request (for example, LL_CIS_REQ), a CIS configuration response (for example, LL_CIS_RSP), and a CIS configuration indication (for example, LL_CIS_IND) may be transmitted between the mobile phone 100 and the left earbud 201-1 or the right earbud 201-2 through the ACL link, to configure the ISO channel.

Figure 6B:
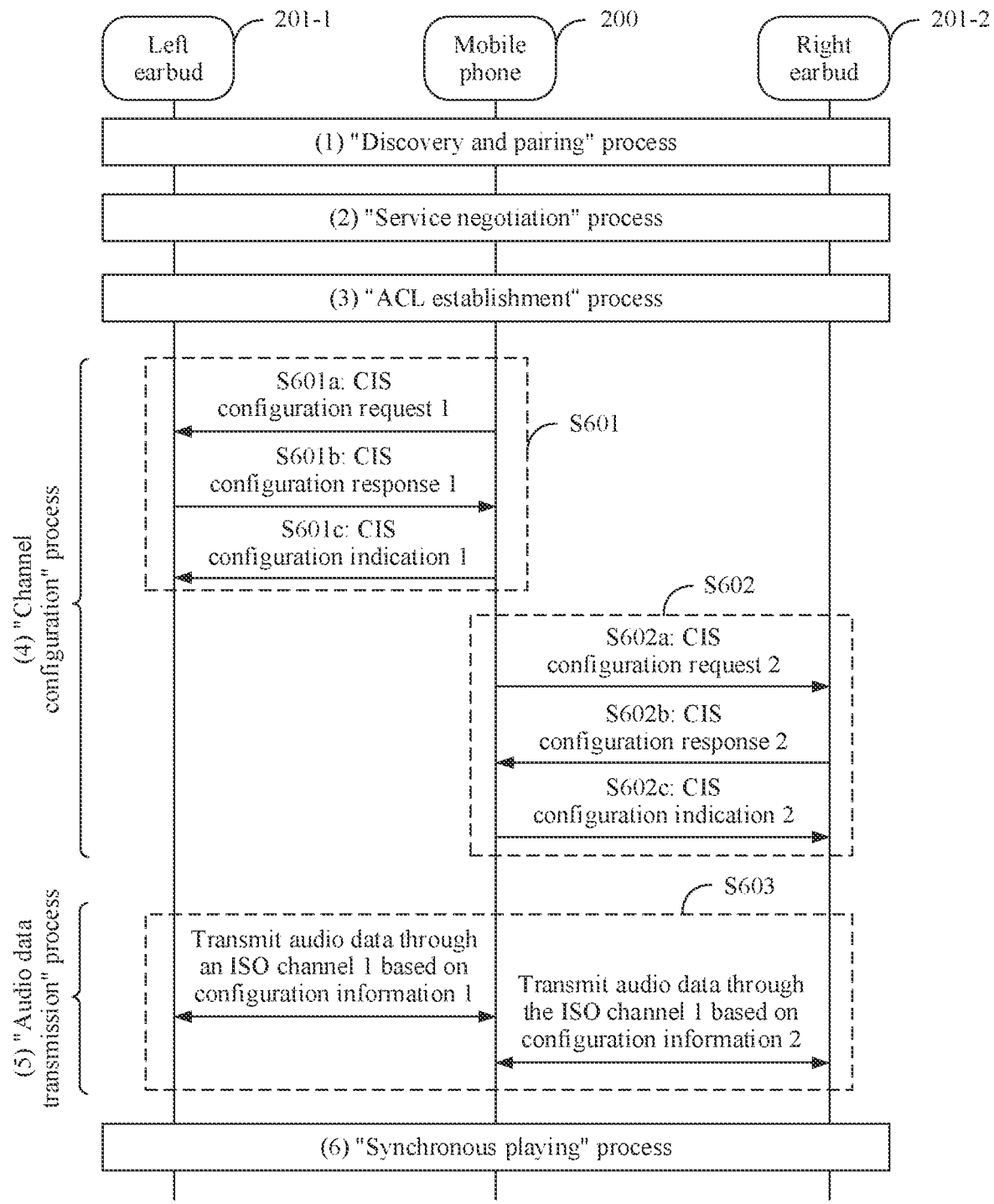
FIG. 6B is a flowchart 2 of a point-to-multipoint data transmission method according to an embodiment of this application.

An example in which the mobile phone 200 configures the ISO channel 1 for the left earbud 201-1 through the ACL link 1 is used. A CIS configuration request 1, a CIS configuration response 1, and a CIS configuration indication 1 may be transmitted between the mobile phone 200 and the left earbud 201-1 through the ACL link 1, to configure the CIS (1) for the left earbud 201-1, so as to configure the ISO channel 1. In other words, the configuration information 1 may be negotiated by using the CIS configuration request, the CIS configuration response, and the CIS configuration indication. As shown in FIG. 6B, S601 shown in FIG. 6A may include S601a to S601c.

S601a: The mobile phone 200 sends the CIS configuration request 1 to the left earbud 201-1 through the ACL link 1.

For example, the CIS configuration request 1 (namely, LL_CIS_REQ) may include the following parameters: a CIG identifier, a CIS identifier (for example, the CIS (1)), duration of "M→S", duration of "S→M", Payload_M→S, Payload_S→M, an NSE, an ISO interval, the CIS (1)_sub-interval, a BN(M→S), a BN(S→M), an FT(M→S), an FT(S→M), and negotiation information 1 about the time parameter used to determine the CIS anchor point (time negotiation information 1 for short).

Table 3 shows an example of a frame structure of the CIS configuration request (namely, LL_CIS_REQ) provided in this embodiment of this application. As shown in Table 3, the LL_CIS_REQ may include: a CIG_ID field, a CIS_ID field, a port physical layer (port physical layer, PHY) information field, a CIS parameter (CIS_Parameters) field, and a time negotiation information field.

TABLE 3

| LL_CIS_REQ | | | | |
| --- | --- | --- | --- | --- |
| CIG_ID | CIS_ID | PHY information | CIS parameter | Time negotiation information |

The CIG_ID field shown in Table 3 is used to carry the CIG identifier. A length of the CIG_ID field may be 1 octet (octet). For example, with reference to Table 1, the CIG_ID field shown in Table 3 may carry the CIG (1).

The CIG_ID field shown in Table 3 is used to carry the CIS identifier. A length of the CIG_ID field may be 1 octet. For example, with reference to Table 1, the CIS_ID field shown in Table 3 may carry the CIS (1).

The PHY information field shown in Table 3 is used to carry the duration of "M→S" and the duration of "S→M". Alternatively, the PHY information field carries indication information used to indicate the duration of "M→S" and the duration of "S→M". The left earbud 201-1 may calculate the duration of "M→S" and the duration of "S→M" based on the indication information. A length of the PHY information field may be 2 octets. One octet is about the duration of "M→S" or the indication information about the duration of "M→S". The other octet is about the duration of "S→M" or the indication information about the duration of "S→M". For example, with reference to Table 1, the PHY information field shown in Table 3 may carry T(M→S) and T(S→M). Alternatively, the PHY information field shown in Table 3 may carry indication information about T(M→S) and T(S→M).

The CIS parameter field shown in Table 3 is used to carry the following parameters: Payload_M→S, Payload_S→M, the NSE, the CIS_sub-interval, the BN(M→S), the BN(S→M), the FT(M→S), the FT(S→M), and the ISO interval. A length of the CIS parameter field is 11 octets.

For example, Table 4 shows an example of a frame structure of the CIS parameter field.

TABLE 4

| CIS parameter | | | | | | | | |
|---|---|---|---|---|---|---|---|---|
| Payload_M -> S | Payload_S -> M | NSE | CIS_sub-interval | BN (M -> S) | BN (S -> M) | FT (M -> S) | FT (S -> M) | ISO interval |

The Payload_M→S field shown in Table 4 is used to carry a parameter indicating the size of the data that can be transmitted in the foregoing "M→S", namely, Payload_M→S. A length of the Payload_M→S field may be 1 octet. For example, with reference to Table 1, the Payload_M→S field shown in Table 4 may carry a parameter a.

The Payload_S→M field shown in Table 4 is used to carry a parameter indicating the size of the data that can be transmitted in the foregoing "S→M", namely, Payload_S→M. A length of the Payload_S→M field may be 1 octet. For example, with reference to Table 1, the Payload_S→M field shown in Table 4 may carry a parameter b.

The NSE field shown in Table 4 is used to carry the NSE. A length of the NSE field may be 1 octet. For example, with reference to Table 1, the NSE field shown in Table 4 may carry a parameter 2.

The CIS_sub-interval field shown in Table 4 is used to carry the CIS_sub-interval. A length of the CIS_sub-interval field may be 3 octets. For example, with reference to Table 1, the CIS_sub-interval field shown in Table 4 may carry a parameter T_S(1).

The BN(M→S) field shown in Table 4 is used to carry the BN(M→S). The BN(S→M) field shown in Table 4 is used to carry the BN(S→M). The FT(M→S) field shown in Table 4 is used to carry the FT(M→S). The FT(S→M) field shown in Table 4 is used to carry the FT(S→M). A length of each of the BN(M→S) field and the BN(S→M) field may be 4 bits (bit). A length of each of the FT(M→S) field and the FT(S→M) field may be 1 octet. For example, with reference to Table 1, the BN(M→S) field shown in Table 4 may carry a parameter BN_(1), the BN(S→M) field may carry a parameter BN_(1), the FT(M→S) field may carry a parameter FT_(1), and the FT(S→M) field may carry a parameter FT_(1).

The ISO interval field shown in Table 4 is used to carry the ISO interval. A length of the ISO interval field may be 2 octets. For example, with reference to Table 1, the ISO interval field shown in Table 4 may carry a parameter T_ISO.

The time negotiation information field shown in Table 3 is used to carry the time negotiation information 1 (namely, the negotiation information 1 about the time parameter used to determine the CIS anchor point). A length of the time negotiation information field may be 8 octets.

The time negotiation information field may include an Offset_Max field, an Offset_Min field, and a CIS count field (namely, a connEventCount field). For example, the frame structure of the CIS configuration request shown in Table 3 may be replaced with a frame structure of the CIS configuration request shown in Table 5.

TABLE 5

| LL_CIS_REQ | | | | | | |
|---|---|---|---|---|---|---|
| CIG_ID | CIS_ID | PHY information | CIS parameter | Offset_Max | Offset_Min | CIS count field |

The Offset_Max field shown in Table 5 is used to carry a maximum value of a CIS offset (for example, CIS_Offset_Max) supported by the mobile phone 200. A length of the Offset_Max field shown in Table 5 may be 3 octets. The Offset_Min field is used to carry a minimum value of the CIS offset (for example, CIS_Offset_Min) supported by the mobile phone 200. A length of the Offset_Min field may be 3 octets. The CIS count field shown in Table 5 is used to carry a clock parameter of the mobile phone 200. A length of the CIS count field may be 2 octets.

S601b: The left earbud 201-1 sends the CIS configuration response 1 to the mobile phone 200 through the ACL link 1.

The CIS configuration response 1 (namely, LL_CIS_RSP) may include the following parameter: negotiation information 2 about the time parameter used to determine the CIS anchor point (time negotiation information 2 for short). For example, the time negotiation information 2 may include a maximum value (for example, CIS_Offset_Max) of a CIS offset supported by the left earbud 201-1, a minimum value (for example, CIS_Offset_Min) of the CIS offset supported by the left earbud 201-1, and a clock parameter of the left earbud 201-1.

For example, Table 6 shows an example of a frame structure of the CIS configuration response (LL_CIS_RSP) provided in this embodiment of this application. As shown in Table 6, LL_CIS_RSP may include an Offset_Max field, an Offset_Min field, and a CIS count field.

TABLE 6

| LL_CIS_RSP | | |
|---|---|---|
| Offset_Max | Offset_Min | CIS count field |

The Offset_Max field shown in Table 6 is used to carry the maximum value of the CIS offset (for example, CIS_Offset_Max) supported by the left earbud 201-1. A length of the Offset_Max field may be 3 octets. The Offset_Min field shown in Table 6 is used to carry the minimum value of the CIS offset (for example, CIS_Offset_Min) supported by the left earbud 201-1. A length of the Offset_Min field may be 3 octets. The CIS count field is used to carry the clock parameter of the left earbud 201-1. A length of the CIS count field may be 2 octets.

S601*c*: The mobile phone 200 sends the CIS configuration indication 1 to the left earbud 201-1 through the ACL link 1.

For example, the CIS configuration indication 1 (namely, LL_CIS_IND) may include the following parameters: time confirmation information, the CIS synchronization delay, and the CIG presentation delay.

Table 7 shows an example of a frame structure of LL_CIS_IND provided in this embodiment of this application. As shown in Table 7, LL_CIS_IND may include a CIS synchronization delay field, a CIG presentation delay field, and a time confirmation information field.

TABLE 7

| LL_CIS_IND | | |
|---|---|---|
| Time confirmation information | CIG presentation delay | CIS synchronization delay |

The CIS synchronization delay field shown in Table 7 is used to carry the CIS synchronization delay. A length of the CIS synchronization delay field may be 3 octets. The CIG presentation delay field shown in Table 7 is used to carry the CIG presentation delay. A length of the CIG presentation delay field may be 3 octets. The time confirmation information field shown in Table 7 is used to carry the time confirmation information. A length of the time confirmation information field may be 5 octets.

The time confirmation information is determined by the mobile phone 200 based on the time negotiation information 1 and the time negotiation information 2 that is in LL_CIS_RSP. The time confirmation information includes CIS_Offset and a negotiated clock parameter. The time negotiation information 1 is used to indicate time information about the mobile phone 200 (for example, CIS_Offset_Max and CIS_Offset_Min supported by the mobile phone 200, and the clock parameter of the mobile phone 200) and time information about the left earbud 201-1 (such as CIS_Offset_Max and CIS_Offset_Min supported by the left earbud 201-1, and the clock parameter of the left earbud 201-1).

The mobile phone 200 may determine, based on CIS_Offset_Max and CIS_Offset_Min supported by the mobile phone 200 and CIS_Offset_Max and CIS_Offset_Min supported by the left earbud 201-1, CIS_Offset that is supported by both the mobile phone 200 and the left earbud 201-1. The mobile phone 200 may determine the negotiated clock parameter based on the clock parameter of the mobile phone 200 and the clock parameter of the left earbud 201-1.

The time confirmation information field shown in Table 7 may include an Offset field and a CIS count field (namely, a connEventCount field). For example, the frame structure of LL_CIS_IND shown in Table 7 may be replaced with a frame structure of LL_CIS_IND shown in Table 8.

TABLE 8

| LL_CIS_IND | | | | |
|---|---|---|---|---|
| Access Address | CIS_Offset | CIG presentation delay | CIS synchronization delay | CIS count field |

The offset field shown in Table 8 is used to carry the foregoing CIS_Offset. A length of the offset field may be 3 octets. The CIS count field shown in Table 8 is used to carry the negotiated clock parameter. A length of the CIS count field may be 2 octets.

Optionally, as shown in Table 8, LL_CIS_RSP may further include the access address (Access Address) field. The access address field may be used to identify an ISO channel between the mobile phone 200 and an earbud (for example, the left earbud 201-1). A length of the access address field may be 4 octets.

Correspondingly, a CIS configuration request 2, a CIS configuration response 2, and a CIS configuration indication 2 may be transmitted between the mobile phone 200 and the right earbud 201-2 through the ACL link 2, to configure the CIS (2) for the right earbud 201-2, so as to configure the ISO channel 2. As shown in FIG. 6B, S602 shown in FIG. 6A may include S602*a* to S602*c*.

S602*a*: The mobile phone 200 sends the CIS configuration request 2 to the right earbud 201-2 through the ACL link 2.

The CIS configuration request 2 is LL_CIS_REQ. For a detailed description of S602*a*, refer to the description of S601*a* in the foregoing embodiment. Details are not described herein again in this embodiment of this application.

S602*b*: The right earbud 201-2 sends the CIS configuration response 2 to the mobile phone 200 through the ACL link 2.

The CIS configuration response 2 is LL_CIS_RSP. For a detailed description of S602*b*, refer to the description of S601*b* in the foregoing embodiment. Details are not described herein again in this embodiment of this application.

S602*c*: The mobile phone 200 sends the CIS configuration indication 2 to the right earbud 201-2 through the ACL link 2.

The CIS configuration indication 2 is LL_CIS_IND. For a detailed description of S602*c*, refer to the description of S601*c* in the foregoing embodiment. Details are not described herein again in this embodiment of this application.

It should be noted that Table 3 or Table 5 merely provides an example of the frame structure of LL_CIS_REQ. Similarly, Table 6 merely shows an example of the frame structure of LL_CIS_RSP, and Table 7 or Table 8 merely shows an example of the frame structure of LL_CIS_IND. Frame structures of LL_CIS_REQ, LL_CIS_RSP, and LL_CIS_IND in this embodiment of this application include but are not limited to the frame structures shown in the foregoing tables.

In addition, a method in which the mobile phone 200 configures the ISO channels for the left and right earbuds of the TWS headset 201 through the ACL links includes but is not limited to the foregoing methods in S601*a* to S601*c* and S602*a* to S602*c*. For example, the mobile phone 200 may pre-configure one or more parameters such as the duration of "M→S" (T (M→S)), the duration of "S→M" (T (S→M)), T_IFS, T_Sub, the CIG presentation delay (T_CIG delay), and the ISO interval for the left earbud 201-1 and the right earbud 201-2 through an air interface. Then, the mobile phone 200 may configure, for the left earbud 201-1 and the right earbud 201-2 by using LL_CIS_REQ, LL_CIS_RSP, and LL_CIS_IND, another parameter other than the pre-configured parameters.

It should be noted that, in different transmission manners, configuration information about the ISO channels configured by the mobile phone 200 for the left and right earbuds of the TWS headset is different. In this embodiment of this application, ISO channel configuration information corresponding to different transmission manners is described in the (5) "audio data transmission" process.

(5) The "Audio Data Transmission" Process

After configuring the ISO channel 1 and the ISO channel 2, the mobile phone 200 may perform audio data transmission with the left earbud 201-1 through the ISO channel 1 based on the configuration information 1, and perform audio data transmission with the right earbud 201-2 through the ISO channel 2 based on the configuration information 2. Specifically, as shown in FIG. 6A or FIG. 6B, after S601 and S602, the method in this embodiment of this application may further include S603.

S603: The mobile phone 200 performs audio data transmission with the left earbud 201-1 through the ISO channel 1 based on the configuration information 1, and performs audio data transmission with the right earbud 201-2 through the ISO channel 2 based on the configuration information 2.

In an embodiment of this application, the mobile phone 200 may perform audio data transmission with the left and right earbuds of the TWS headset 201 in a serial scheduling transmission manner.

In each CIG event of the CIG (1), the mobile phone 200 may perform audio data transmission with the left and right earbuds of the TWS headset 201 in the serial scheduling transmission manner. In this embodiment of this application, an example in which the mobile phone 200 performs, in the CIG event (x), audio data transmission with the left and right earbuds of the TWS headset 201 in the serial scheduling transmission manner is used to describe a point-to-multi-point data transmission method that is based on the serial scheduling transmission manner.

As shown in FIG. 7A, the mobile phone 200 may send audio data (for example, an audio data packet 1) to the left earbud 201-1 in "M→S" in a subevent (1_1) of a CIS (1) event (x) from a CIS (1).x anchor point (namely, a CIG (x) anchor point). The left earbud 201-1 may receive, in "M→S" in the subevent (1_1) shown in FIG. 7A, the audio data (for example, the audio data packet 1) sent by the mobile phone 200.

The mobile phone 200 and the left earbud 201-1 may calculate the CIG (x) anchor point (namely, the CIS (1).x anchor point) based on the time parameter that is in the configuration information 1 and that is used to determine the anchor point. For example, the mobile phone 200 may determine the CIS (1).x anchor point based on a CIS (1) offset that is shown in FIG. 7A and carried in the CIS_Offset field shown in Table 8 and a CIG event count value carried in the CIS count value field shown in Table 8. The mobile phone 200 and the left earbud 201-1 may determine, based on Payload_M→S in the configuration information 1, a size of audio data that can be carried in "M→S" (for example, "M→S" in the subevent (1_1) or a subevent (1_2)).

The left earbud 201-1 may send first data to the mobile phone 200 in "S→M" in the subevent (1_1) shown in FIG. 7A. The mobile phone 200 may receive, in "S→M" in the subevent (1_1) shown in FIG. 7A, the first data sent by the left earbud 201-1.

The first data may include feedback information returned by the left earbud 201-1 to the mobile phone 200, and/or audio data collected by a microphone (for example, the microphone 260) in the left earbud 201-1. The feedback information may be an ACK or a NACK of the audio data packet 1.

The mobile phone 200 and the left earbud 201-1 may calculate a start time point of "S→M" in the subevent (1_1) based on the CIS (1).x anchor point, the duration of "M→S" (for example, T (M→S)), and T_IFS.

For example, in this embodiment of this application, a start time point of "S→M" in a subevent (m_k) of the CIG (x) event may be calculated by using the following formula (1), where m may be a CIS identifier, and k may be an integer in [1, the NSE]:

$$t(S{\to}M)\_m,k = t\_CIS(m){\cdot}x + (k-1){\times}(T\_S(m)) + T\_(M{\to}S) + T\_IFS \quad \text{Formula (1)}$$

t (S→M)_m,k is the start time point of "S→M" in the subevent (m_k) of the CIG (x) event. T_S(m) is a CIS (m)_sub-interval. t_CIS (m).x is a CIS (m).x anchor point, namely, an anchor point of a CIS (m) in the CIG (x) event.

For example, the mobile phone 200 and the left earbud 201-1 may calculate a start time point t (S→M)_1,1 of "S→M" in the subevent (1_1) by using the foregoing formula (1). t (S→M)_1,1=t_CIS (1).x+T_(M→S)+T_IFS. t_CIS (1).x is the CIS (1).x anchor point.

The left earbud 201-1 and the mobile phone 200 may determine a size of audio data that can be carried in "S→M" (for example, "S→M" in the subevent (1_1) or the subevent (1_2)) based on Payload_S→M in the configuration information 1.

It may be understood that, because the NSE=2, the CIS (1) event (x) may include two subevents. For example, as shown in FIG. 7A, the CIS (1) event (x) includes the subevent (1_1) and the subevent (1_2). In the serial scheduling transmission manner, after performing audio data transmission with the left earbud 201-1 in "M→S" and "S→M" in the subevent (1_1) shown in FIG. 7A, the mobile phone 200 may continue to perform audio data transmission with the left earbud 201-1 in the next subevent (1_2) of the CIS (1) event (x).

It is assumed that the mobile phone 200 receives the ACK of the audio data packet 1 in "S→M" in the subevent (1_1). As shown in FIG. 7A, the mobile phone 200 may send audio data (for example, an audio data packet 2) to the left earbud 201-1 in "M→S" in the subevent (1_2). The left earbud 201-1 may receive, in "M→S" in the subevent (1_2), the audio data (for example, the audio data packet 2) sent by the mobile phone 200. The mobile phone 200 and the left earbud 201-1 may calculate a start time point of "M→S" in the subevent (1_2) based on the CIS (1).x anchor point and the CIS (1)_sub-interval.

For example, in this embodiment of this application, a start time point of "M→S" in the subevent (m_k) of the CIG (x) event may be calculated by using the following formula (2), where m may be the CIS identifier, and k may be an integer in [1, the NSE]:

$$t(M{\to}S)\_m,k = t\_CIS(m){\cdot}x + (k-1){\times}(T\_S(m)) \quad \text{Formula (2)}$$

t (M→S)_m,k is the start time point of "M→S" in the subevent (m_k) of the CIG (x) event. t_CIS (m).x is the CIS (m).x anchor point, namely, the anchor point of the CIS (m) in the CIG (x) event. T_S(m) is the CIS (m)_sub-interval.

For example, the mobile phone 200 and the left earbud 201-1 may calculate a start time point t (M→S)_1,2 of "M→S" in the subevent (1_2) by using the foregoing formula (2). t (M→S)_1,2=t_CIS (1).x+T_S(1). t_CIS (1).x is the CIS (1).x anchor point, and T_S(1) is the CIS (1)_sub-interval.

The left earbud 201-1 may send second data to the mobile phone 200 in "S→M" in the subevent (1_2) shown in FIG. 7A. The mobile phone 200 may receive, in "S→M" in the subevent (1_2) shown in FIG. 7A, the second data sent by the left earbud 201-1. The second data may include the feedback information returned by the left earbud 201-1 to the mobile phone 200, and/or the audio data collected by the microphone (for example, the microphone 260) in the left earbud 201-1. The feedback information may be an ACK or a NACK of the audio data 2.

The mobile phone 200 and the left earbud 201-1 may calculate a start time point of "S→M" in the subevent (1_2) based on the start time point of "M→S" in the subevent (1_2), T (M→S), and T_IFS. For example, the mobile phone 200 and the left earbud 201-1 may calculate a start time point t (S→M)_1,2 of "S→M" in the subevent (1_2) by using the formula (1). t (S→M)_1,2=t_CIS (1).x+T_S(1)+T_(M→S)+T_IFS. t_CIS (1).x is the CIS (1).x anchor point, and T_S(1) is the CIS (1)_sub-interval. t_CIS (1).x+T_S(1) is the start time point t (M→S)_1,2 of "M→S" in the subevent (1_2).

As shown in FIG. 7A, the mobile phone 200 may send audio data (for example, the audio data packet 1) to the right earbud 201-2 in "M→S" in a subevent (2_1) of a CIS (2) event (x) from a CIS (2).x anchor point. The right earbud 201-2 may receive, in "M→S" in the subevent (2_1) shown in FIG. 7A, the audio data (for example, the audio data packet 1) sent by the mobile phone 200. The mobile phone 200 and the right earbud 201-2 may calculate the CIS (2).x anchor point based on the time parameter, in the configuration information 2, that is used to determine the anchor point. For example, the mobile phone 200 may determine the CIS (2).x anchor point based on a CIS (2) offset that is shown in FIG. 7A and carried in the CIS_Offset field shown in Table 8 and the CIG event count value carried in the CIS count value field shown in Table 8. The mobile phone 200 and the right earbud 201-2 may determine, based on Payload_M→S in the configuration information 2, a size of audio data that can be carried in "M→S" (for example, "M→S" in the subevent (2_1)).

The right earbud 201-2 may send third data to the mobile phone 200 in "S→M" in the subevent (2_1). The mobile phone 200 may receive, in "S→M" in the subevent (2_1), the third data sent by the right earbud 201-2. The third data may include feedback information returned by the right earbud 201-2 to the mobile phone 200, and/or audio data collected by a microphone (for example, the microphone 260) in the right earbud 201-2. The feedback information may be the ACK or the NACK of the audio data 1.

The mobile phone 200 and the right earbud 201-2 may calculate a start time point of "S→M" in the subevent (2_1) based on the CIS (2).x anchor point, T(M→S), and T_IFS. For example, the mobile phone 200 and the right earbud 201-2 may calculate a start time point t (S→M)_2,1 of "S→M" in the subevent (2_1) by using the foregoing formula (1). t (S→M)_2,1=t_CIS (2).x+T (M→S)+T_IFS. t_CIS (2).x is the CIS (2).x anchor point.

The right earbud 201-2 and the mobile phone 200 may determine a size of audio data that can be carried in "S→M" (for example, "S→M" in the subevent (2_1) or a subevent (2_2)) based on Payload_S→M in the configuration information 2.

It may be understood that, because the NSE=2, the CIS (2) event (x) may include two subevents. For example, as shown in FIG. 7A, the CIS (2) event (x) includes the subevent (2_1) and the subevent (2_2). In the serial scheduling transmission manner, after performing audio data transmission with the right earbud 201-2 in the subevent (2_1) of the CIS (2) event (x), the mobile phone 200 may continue to perform audio data transmission with the right earbud 201-2 in the next subevent (2_2) of the CIS (2) event (x).

It is assumed that the mobile phone 200 receives the ACK of the audio data packet 1 in "S→M" in the subevent (2_1). As shown in FIG. 7A, the mobile phone 200 may send audio data (for example, the audio data packet 2) to the right earbud 201-2 in "M→S" in the subevent (2_2). The right earbud 201-2 may receive, in "M→S" in the subevent (2_2), the audio data (for example, the audio data packet 2) sent by the mobile phone 200.

The mobile phone 200 and the right earbud 201-2 may calculate a start time point of "M→S" in the subevent (2_2) based on the CIS (2).x anchor point and a CIS (2)_sub-interval. For example, the mobile phone 200 and the right earbud 201-2 may calculate a start time point t (M→S)_2,2 of "M→S" in the subevent (2_2) by using the foregoing formula (2). t (M→S)_2,2=t_CIS (2).x+T_S(2). t_CIS (2).x is the CIS (2).x anchor point, and T_S(2) is the CIS (2)_sub-interval.

The right earbud 201-2 may send fourth data to the mobile phone 200 in "S→M" in the subevent (2_2). The mobile phone 200 may receive, in "S→M" in the subevent (2_2), the fourth data sent by the left earbud 201-1. The fourth data may include the feedback information returned by the right earbud 201-2 to the mobile phone 200, and/or the audio data collected by the microphone (for example, the microphone 260) in the right earbud 201-2. The feedback information may be the ACK or the NACK of the audio data 2.

The mobile phone 200 and the right earbud 201-2 may calculate a start time point of "S→M" in the subevent (2_2) based on the start time point of "M→S" in the subevent (2_2), T(M→S), and T_IFS.

For example, the mobile phone 200 and the right earbud 201-2 may calculate a start time point t (S→M)_2,2 of "S→M" in the subevent (2_2) by using the foregoing formula (1): t (S→M)_2,2=t_CIS (2).x+T_S(2)+T(M→S)+T_IFS. t_CIS (2).x is the CIS (2).x anchor point. T_S(2) is the CIS (2)_sub-interval.

Generally, left and right earbuds of a TWS headset each include a microphone (for example, the microphone 260). In a scenario in which the left and right earbuds of the TWS headset are used as audio input/output devices of the mobile phone 200 to implement voice communication, a microphone of only one earbud may be turned on, or microphones of the two earbuds may be turned on.

In an application scenario, a microphone of only one earbud may be turned on, and a microphone of the other earbud is turned off. For example, the microphone of the left earbud 201-1 is turned on, and the microphone of the right earbud 201-2 is turned off. Alternatively, the microphone of the left earbud 201-1 is turned off, and the microphone of the right earbud 201-2 is turned on.

Figure 7B:
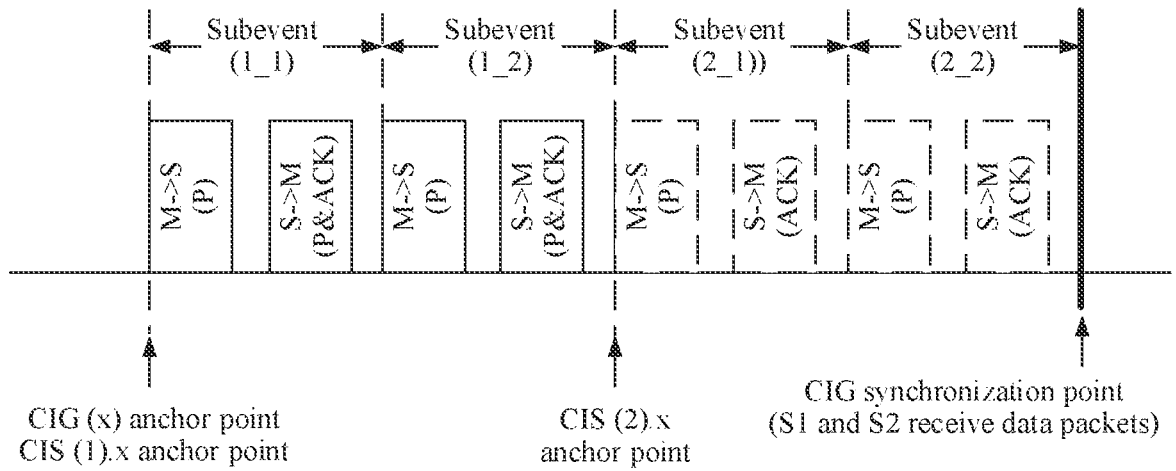
FIG. 7B is a schematic diagram 2 of a principle of a serial scheduling transmission manner according to an embodiment of this application.

An example in which the microphone of the left earbud 201-1 is turned on, and the microphone of the right earbud 201-2 is turned off is used. As shown in FIG. 7B, the mobile phone 200 may separately transmit audio data packets (for example, P) to the left earbud 201-1 and the right earbud 201-2 in different M→S. The left earbud 201-1 may transmit an audio data packet (for example, P) and feedback information (for example, an ACK) to the mobile phone 200 in "S→M" in a subevent (1_1) and a subevent (1_2) shown in FIG. 7B. The right earbud 201-2 can transmit only feedback information (for example, an ACK) to the mobile phone 200 in "S→M" in a subevent (2_1) and a subevent (2_2) shown in FIG. 7B. In this example, the first data and the second data may include audio data and feedback information, and the third data and the fourth data include only feedback information.

Figure 7C:
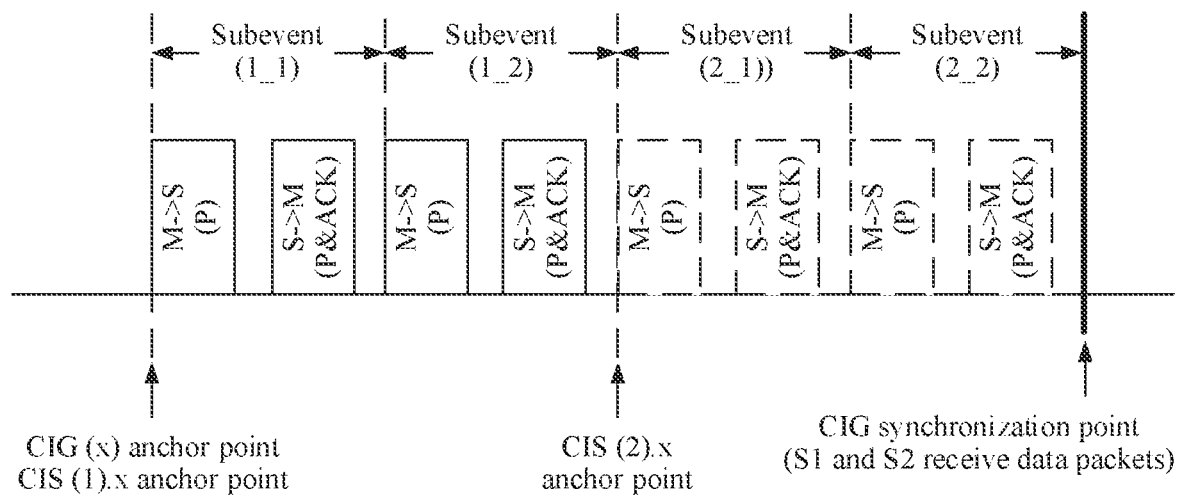
FIG. 7C is a schematic diagram 3 of a principle of a serial scheduling transmission manner according to an embodiment of this application.

In another application scenario, the microphones of the two earbuds may be turned on. To be specific, the microphones of both the left earbud 201-1 and the right earbud 201-2 are turned on. As shown in FIG. 7C, the mobile phone 200 may separately transmit audio data packets (for example, P) to the left earbud 201-1 and the right earbud 201-2 in different M→S. The left earbud 201-1 may transmit an audio data packet (for example, P) and feedback information (for example, an ACK) to the mobile phone 200 in "S→M" in a subevent (1_1) and a subevent (1_2) shown in FIG. 7B. The right earbud 201-2 may transmit an audio data packet (for example, P) and feedback information (for example, the ACK) to the mobile phone 200 in "S→M" in a subevent (2_1) and a subevent (2_2) shown in FIG. 7B. In this example, the first data, the second data, the third data, and the fourth data each may include feedback information and an audio data packet. In addition, audio data in the first data and the third data is the same, and audio data in the second data and the fourth data is the same. The mobile phone 200 may perform audio mixing processing on the first data and the third data, and send processed audio data to a peer device in voice communication. The mobile phone 200 may perform audio mixing processing on the third data and the fourth data, and then send processed audio data to the peer device in voice communication.

It should be noted that, for example, the first data may include the feedback information and the audio data packet. In this embodiment of this application, that the first data may include the feedback information and the audio data packet specifically means that the first data is likely to include the feedback information and the audio data packet, but the first data is not necessarily required to include the feedback information and the audio data packet. For example, in a scenario in which the left and right earbuds of the TWS headset 201 are used as audio input/output devices of the mobile phone 200 to implement a call, it is assumed that the microphone of the left earbud 201-1 is turned on. If the microphone of the left earbud 201-1 collects audio data, an audio data packet may be transmitted to the mobile phone 200 in "S→M". If the microphone of the left earbud 201-1 collects no audio data, no audio data packet is transmitted in "S→M".

In another application scenario (for example, a scenario in which the left and right earbuds of the TWS headset are used as the audio input/output devices of the mobile phone 200 to implement music playing), the first data, the second data, the third data, and the fourth data each may include feedback information, but do not include audio data. To be specific, the left earbud 201-1 and the right earbud 201-2 may transmit feedback information (for example, an ACK) to the mobile phone 200 in "S→M", but do not transmit an audio data packet (for example, P). This is not shown in the figure.

(6) The "Synchronous Playing" Process

The left earbud 201-1 may calculate a CIG synchronization point based on the CIS (1).x anchor point and a CIS (1) synchronization delay shown in FIG. 7A, and calculate a CIG presentation point based on the CIG synchronization point and a CIG presentation delay. Similarly, the right earbud 201-2 may calculate a CIG synchronization point based on the CIS (2).x anchor point and a CIS (2) synchronization delay shown in FIG. 7A, and calculate the CIG presentation point based on the CIG synchronization point and the CIG presentation delay. It may be understood that both the left earbud 201-1 and the right earbud 201-2 may receive the audio data packet 1 and the audio data packet 2 at the CIG synchronization point shown in FIG. 7A. The left earbud 201-1 and the right earbud 201-2 may decode the received audio data packet 1 and the received audio data packet 2, and simultaneously play decoded audio data at the CIG presentation point, so that the left earbud 201-1 and the right earbud 201-2 can synchronously play the audio data.

In another embodiment, to improve anti-interference performance of audio data transmission, in the "audio data transmission" process, the mobile phone 200 may perform audio data transmission with the left and right earbuds of the TWS headset 201 in an interleaved scheduling transmission manner.

In each CIG event of the CIG (1), the mobile phone 200 may perform audio data transmission with the left and right earbuds of the TWS headset 201 in the interleaved scheduling transmission manner. In this embodiment of this application, an example in which the mobile phone 200 performs, in the CIG event (x), audio data transmission with the left and right earbuds of the TWS headset 201 in the interleaved scheduling transmission manner is used to describe a point-to-multipoint data transmission method that is based on the interleaved scheduling transmission manner.

As shown in FIG. 8, the mobile phone 200 may send audio data (for example, an audio data packet 1) to the left earbud 201-1 in "M→S" in a subevent (1_1) of a CIS (1) event (x) from a CIS (1).x anchor point. Specifically, the left earbud 201-1 may receive, in "M→S" in the subevent (1_1) shown in FIG. 8, the audio data (for example, the audio data packet 1) sent by the mobile phone 200. The left earbud 201-1 may send first data to the mobile phone 200 in "S→M" in the subevent (1_1). The mobile phone 200 may receive, in "S→M" in the subevent (1_1), the first data sent by the left earbud 201-1.

Different from the serial scheduling transmission manner, in the interleaved scheduling transmission manner, after performing audio data transmission with the left earbud 201-1 in the subevent (1_1), the mobile phone 200 may perform audio data transmission with the right earbud 201-2. For example, as shown in FIG. 8, after performing audio data transmission with the left earbud 201-1 in the subevent (1_1) of the CIS (1) event (x), the mobile phone 200 may perform audio data transmission with to the right earbud 201-2 in a subevent (2_1) of a CIS (2). As shown in FIG. 8, the mobile phone 200 may send the audio data (for example, the audio data packet 1) to the right earbud 201-2 in "M→S" in the subevent (2_1) of a CIS (2) event (x) from a CIS (2).x anchor point. The right earbud 201-2 may receive, in "M→S" in the subevent (2_1) shown in FIG. 8, the audio data (for example, the audio data packet 1) sent by the mobile phone 200. The right earbud 201-2 may send third data to the mobile phone 200 in "S→M" in the subevent (2_1). The mobile phone 200 may receive, in "S→M" in the subevent (2_1), the third data sent by the right earbud 201-2.

It should be noted that the CIS (2).x anchor point in the interleaved scheduling transmission manner shown in FIG. 8 is different from the CIS (2).x anchor point in the serial scheduling transmission manner shown in FIG. 7A.

As shown in FIG. 8, after performing audio data transmission with the right earbud 201-2 in the subevent (2_1), the mobile phone 200 may perform audio data transmission with the left earbud 201-1 in a subevent (1_2) of a CIS (1). It is assumed that the mobile phone 200 receives an ACK of the audio data packet 1 in "S→M" in the subevent (1_1). As shown in FIG. 8, the mobile phone 200 may send audio data (for example, an audio data packet 2) to the left earbud 201-1 in "M→S" in the subevent (1_2). The left earbud 201-1 may receive, in "M→S" in the subevent (1_2), the audio data (for example, the audio data packet 2) sent by the mobile phone 200. The left earbud 201-1 may send second data to the mobile phone 200 in "S→M" in the subevent (1_2). The mobile phone 200 may receive, in "S→M" in the subevent (1_2), the second data sent by the left earbud 201-1.

As shown in FIG. 8, after performing audio data transmission with the left earbud 201-1 in the subevent (1_2), the mobile phone 200 may perform audio data transmission with the right earbud 201-2 in a subevent (2_2) of the CIS (2). It is assumed that the mobile phone 200 receives the ACK of the audio data packet 1 in "S→M" in the subevent (2_1). As shown in FIG. 8, the mobile phone 200 may send audio data (for example, the audio data packet 2) to the right earbud 201-2 in "M→S" in the subevent (2_2). The right earbud 201-2 may receive, in "M→S" in the subevent (2_2), the audio data (for example, the audio data packet 2) sent by the mobile phone 200. The right earbud 201-2 may send fourth data to the mobile phone 200 in "S→M" in the subevent (2_2). The mobile phone 200 may receive, in "S→M" in the subevent (2_2), the fourth data sent by the left earbud 201-1.

In the interleaved scheduling transmission manner, a method for determining the CIS (1).x anchor point by the mobile phone 200 and the left earbud 201-1, a method for determining the CIS (2).x anchor point by the mobile phone 200 and the right earbud 201-2, a method for determining a size of audio data that can be carried in "M→S", a method for determining a size of audio data that can be carried in "S→M", a method for calculating start time points of "M→S" and "S→M", and the first data, the second data, the third data, and the fourth data, refer to related descriptions in the serial scheduling transmission manner. Details are not described herein in this embodiment of this application.

The left earbud 201-1 may calculate a CIG synchronization point based on the CIS (1).x anchor point and a CIS (1) synchronization delay shown in FIG. 8, and calculate a CIG presentation point based on the CIG synchronization point and a CIG presentation delay. Similarly, the right earbud 201-2 may calculate a CIG synchronization point based on the CIS (2).x anchor point and a CIS (2) synchronization delay shown in FIG. 8, and calculate the CIG presentation point based on the CIG synchronization point and the CIG presentation delay. It may be understood that both the left earbud 201-1 and the right earbud 201-2 may receive the audio data packet 1 and the audio data packet 2 at the CIG synchronization point shown in FIG. 8. The left earbud 201-1 and the right earbud 201-2 may decode the received audio data packet 1 and the received audio data packet 2, and simultaneously play decoded audio data at the CIG presentation point, so that the left earbud 201-1 and the right earbud 201-2 can synchronously play the audio data.

In this embodiment of this application, the mobile phone 200 may interleave the subevent (1_1) and the subevent (1_2) of the CIS (1) and the subevent (2_1) and the subevent (2_2) of the CIS (2) in terms of time. In other words, audio data of the CIS (1) and audio data of the CIS (2) may be interleaved in terms of time for transmission. In this way, different CISs are more evenly interfered, and the anti-interference performance of the audio data transmission can be improved.

In the foregoing transmission manners of serial scheduling and interleaved scheduling, the mobile phone 200 may separately transmit same audio data to the left and right earbuds of the TWS headset 201 in different time periods. For example, the mobile phone 200 transmits the audio data packet 1 to the left earbud 201-1 in "M→S" in the subevent (1_1) shown in FIG. 7A or FIG. 8. The mobile phone 200 transmits the audio data packet 1 to the right earbud 201-2 in "M→S" in the subevent (2_1) shown in FIG. 7A or FIG. 8. If the mobile phone 200 repeatedly transmits same audio data in different time periods, transmission resources are wasted, and effective utilization of the transmission resources is reduced. To improve effective utilization of the transmission resources, in another embodiment, the mobile phone 200 may perform audio data transmission with the left and right earbuds of the TWS headset 201 in a joint scheduling transmission manner.

In each CIG event of the CIG (1), the mobile phone 200 may perform audio data transmission with the left and right earbuds of the TWS headset 201 in the joint scheduling transmission manner. In this embodiment of this application, an example in which the mobile phone 200 performs, in the CIG event (x), audio data transmission with the left and right earbuds of the TWS headset 201 in the joint scheduling transmission manner is used to describe a point-to-multipoint data transmission method that is based on the joint scheduling transmission manner.

It should be noted that, as shown in FIG. 9A, a CIS (1).x anchor point is the same as a CIS (2).x anchor point. In addition, a CIS (1)_sub-interval is the same as a CIS (2)_sub-interval.

As shown in FIG. 9A, the mobile phone 200 may send audio data (for example, an audio data packet 1) in a frequency hopping manner in "M→S" (namely, "M→S" in bold in FIG. 9A) in a subevent (1_1) of a CIS (1) event (x) and a subevent (2_1) of a CIS (2) event (x) from the CIS (1).x anchor point (namely, the CIS (2).x anchor point). The left earbud 201-1 may receive, in the frequency hopping manner in "M→S" (namely, "M→S" in bold) in the subevent (1_1) shown in FIG. 9A, the audio data packet 1 sent by the mobile phone 200. The right earbud 201-2 may receive, in the frequency hopping manner in "M→S" (namely, "M→S" in bold) in the subevent (2_1) shown in FIG. 9A, the audio data packet 1 sent by the mobile phone 200.

For example, the mobile phone 200 may send the audio data packet 1 through frequency hopping at a relatively high speed in "M→S" in the subevent (1_1) and the subevent (2_1). The left earbud 201-1 may receive the audio data packet 1 through frequency hopping at a relatively slow speed in "M→S" in the subevent (1_1). When the left earbud 201-1 and the mobile phone 200 are synchronized to a same hopping pattern (hopping pattern), the left earbud 201-1 may receive the audio data packet 1. The right earbud 201-2 may receive the audio data packet 1 through frequency hopping at a relatively slow speed in "M→S" in the subevent (2_1). When the right earbud 201-2 and the mobile phone 200 are synchronized to a same hopping pattern, the right earbud 201-2 may receive the audio data packet 1.

It should be noted that in this embodiment of this application, an example in which the mobile phone 200 is used as a master device, and the left earbud 201-1 and the right earbud 201-2 are used as slave devices is merely used for description herein. Alternatively, in actual application, the left earbud 201-1 and the right earbud 201-2 may be used as master devices, and the mobile phone 200 may be used as a slave device. This is not specifically limited herein. In addition, for a frequency hopping speed of the master device and a frequency hopping speed of the slave device, an example in which the master device performs frequency hopping at a relatively high speed and the slave device performs frequency hopping at a relatively low speed is merely used for description in this embodiment of this application. No specific limitation is imposed herein.

It should be noted that, in the foregoing transmission manners of serial scheduling and interleaved scheduling, the mobile phone 200 also performs audio data transmission with the left earbud 201-1 and the right earbud 201-2 in the foregoing frequency hopping manner. However, a difference lies in that the mobile phone 200 uses a TDMA manner to separately perform audio data transmission with the left earbud 201-1 and the right earbud 201-2 in different time periods in the frequency hopping manner.

As shown in FIG. 9A, the left earbud 201-1 may send first data to the mobile phone 200 in "S→M" ("S→M" whose solid line is not bold) in the subevent (1_1). The mobile phone 200 may receive, in "S→M" in the subevent (1_1), the first data sent by the left earbud 201-1. The right earbud 201-2 may send third data to the mobile phone 200 in "S→M" (dashed-line "S→M") in the subevent (2_1). The mobile phone 200 may receive, in "S→M" in the subevent (2_1), the third data sent by the right earbud 201-2.

The mobile phone 200 may send audio data (for example, an audio data packet 2) in the frequency hopping manner in "M→S" (namely, "M→S" in bold) in a subevent (1_2) and a subevent (2_2) that are shown in FIG. 9A. The left earbud 201-1 may receive, in the frequency hopping manner in "M→S" in the subevent (1_2) shown in FIG. 9A, the audio data packet 2 sent by the mobile phone 200. The right earbud 201-2 may receive, in the frequency hopping manner in "M→S" in the subevent (2_2) shown in FIG. 9A, the audio data packet 2 sent by the mobile phone 200.

A method in which the mobile phone 200 sends the audio data packet 2 in "M→S" in the subevent (1_2) and the subevent (2_2) shown in FIG. 9A, a method in which the left earbud 201-1 receives the audio data packet 2 in the frequency hopping manner in "M→S" in the subevent (1_2), and a method in which the right earbud 201-2 receives the audio data packet 2 in the frequency hopping manner in "M→S" in the subevent (2_2), refer to the detailed descriptions of the frequency hopping manner in the foregoing embodiment. Details are not described herein again in this embodiment of this application.

As shown in FIG. 9A, the left earbud 201-1 may send second data to the mobile phone 200 in "S→M" ("S→M" whose solid line is not bold) in the subevent (1_2). The mobile phone 200 may receive, in "S→M" in the subevent (1_2), the second data sent by the left earbud 201-1. The right earbud 201-2 may send fourth data to the mobile phone 200 in "S→M" (dashed-line "S→M") in the subevent (2_2). The mobile phone 200 may receive, in "S→M" in the subevent (2_2), the fourth data sent by the right earbud 201-2.

In the joint scheduling transmission manner, a method for determining the CIS (1).x anchor point by the mobile phone 200 and the left earbud 201-1, a method for determining the CIS (2).x anchor point by the mobile phone 200 and the right earbud 201-2, a method for determining a size of audio data that can be carried in "M→S", a method for determining a size of audio data that can be carried in "S→M", a method for calculating start time points of "M→S" and "S→M" by the mobile phone 200 and the left earbud 201-1, a method for calculating a start time point of "M→S" by the mobile phone 200 and the right earbud 201-2, and the first data, the second data, the third data, and the fourth data, refer to related descriptions in the serial scheduling transmission manner. Details are not described herein in this embodiment of this application. For example, the mobile phone 200, the left earbud 201-1, and the right earbud 201-2 may calculate the start time point of "M→S" by using the foregoing formula (2).

For example, a start time point t (M→S)_1,1 of "M→S" in the subevent (1_1) is equal to t_CIS (1).x. A start time point t (M→S)_1,2 of M→S in the subevent (1_2) is equal to t_CIS (1).x+T_S(1). t_CIS (1).x is the CIS (1).x anchor point, and T_S(1) is a CIS (1)_sub-interval.

For another example, a start time point t (M→S)_2,1 of "M→S" in the subevent (2_1) is equal to t_CIS (2).x. A start time point t (M→S)_2,2 of M→S in the subevent (2_2) is equal to t_CIS (2).x+T_S(2). t_CIS (2).x is the CIS (2).x anchor point, and T_S(2) is a CIS (2)_sub-interval.

However, in the joint scheduling transmission manner, a method for calculating the start time point of "S→M" by the mobile phone 200 and the right earbud 201-2 is different from the method for calculating the start time point of "S→M" in the serial scheduling transmission manner.

Figure 9B:
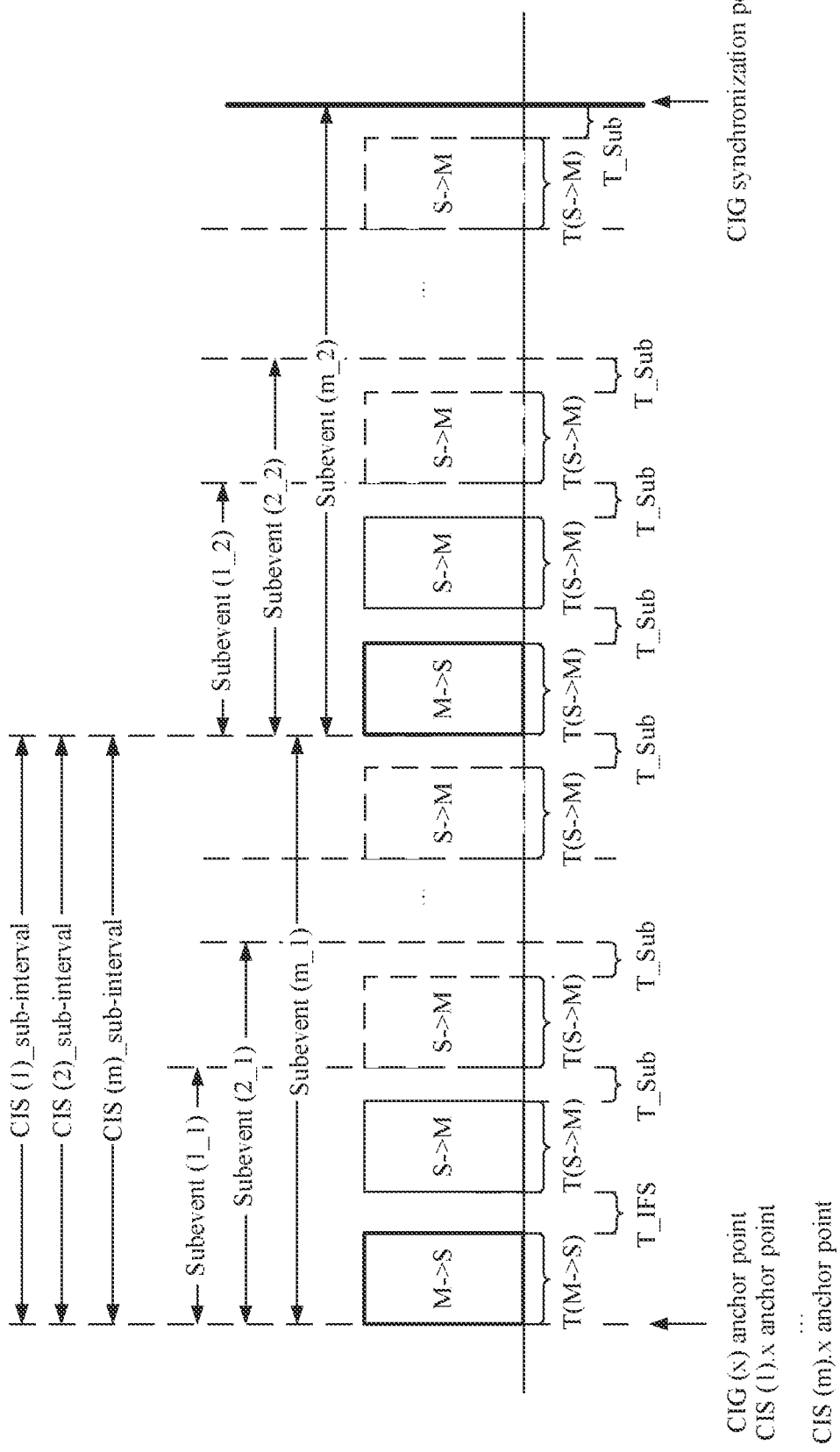
FIG. 9B is a schematic diagram 2 of a principle of a joint scheduling transmission manner according to an embodiment of this application.

For example, referring to FIG. 9B, it can be learned that in this embodiment of this application, a start time point of "S→M" in a subevent (m_k) of the CIG (x) event may be calculated by using the following formula (3), where m may be a CIS identifier, and k may be an integer in [1, the NSE]:

$$t(S{\to}M)\_m,k = t\_CIS(m){\cdot}x + (k-1) \times (T\_S(m)) + (T\_(M{\to}S) + T\_IFS) + (m-1) \times (T\_(S{\to}M) + T\_Sub) \quad \text{Formula (3)}$$

t (S→M)_m,k is the start time point of "S→M" in the subevent (m_k) of the CIG (x) event. T_(m) is a CIS (m)_sub-interval. t_CIS (m).x is a CIS (m).x anchor point, namely, an anchor point of a CIS (m) in the CIG (x) event.

For example, the mobile phone 200 and the left earbud 201-1 may obtain, through calculation by using the foregoing formula (3), the start time point t (S→M)_1,1 of "S→M" in the subevent (1_1) and the start time point t (S→M)_1,2 of "S→M" in the subevent (1_2) that are shown in FIG. 9A. t (S→M)_1,1=t_CIS (1).x+T_(M→S)+T_IFS. t (S→M)_1,2=t_CIS (1).x+T_S(1)+T_(M→S)+T_IFS. t_CIS (1).x is the CIS (1).x anchor point, and T_S(1) is the CIS (1)_sub-interval.

Similarly, the mobile phone 200 and the right earbud 201-2 may obtain, through calculation by using the formula (3), the start time point t (S→M)_2,1 of "S→M" in the subevent (2_1) and the start time point t (S→M)_2,2 of "S→M" in the subevent (2_2) that are shown in FIG. 9A. t (S→M)_2,1=t_CIS (2).x+T_(M→S)+T_IFS+T_(S→M)+T_Sub. t (S→M)_2,2=t_CIS (2).x+T_S(2)+T_(M→S)+T_IFS+T_(S→M)+T_Sub. t_CIS (2).x is the CIS (2).x anchor point, and T_S(2) is the CIS (2)_sub-interval.

The left earbud 201-1 may calculate a CIG synchronization point based on the CIS (1).x anchor point and a CIS (1) synchronization delay shown in FIG. 9A, and calculate a CIG presentation point based on the CIG synchronization point and a CIG presentation delay. Similarly, the right earbud 201-2 may calculate a CIG synchronization point based on the CIS (2).x anchor point and a CIS (2) synchronization delay shown in FIG. 9A, and calculate the CIG presentation point based on the CIG synchronization point and the CIG presentation delay. It may be understood that both the left earbud 201-1 and the right earbud 201-2 may receive the audio data packet 1 and the audio data packet 2 at the CIG synchronization point shown in FIG. 9A. The left earbud 201-1 and the right earbud 201-2 may decode the received audio data packet 1 and the received audio data packet 2, and simultaneously play decoded audio data at the CIG presentation point, so that the left earbud 201-1 and the right earbud 201-2 can synchronously play the audio data.

In this embodiment of this application, the mobile phone 200 may send an audio data packet at a same time point (namely, the CIS (1).x anchor point and the CIS (2).x anchor point, where the CIS (1).x anchor point and the CIS (2).x anchor point are the same) in the frequency hopping manner. In this way, the left and right earbuds of the TWS headset 201 may also receive the audio data packet in the same "M→S" in the frequency hopping manner. In this way, the mobile phone 200 does not repeatedly transmit same audio data in different time periods, so that a waste of transmission resources can be reduced, and effective utilization of the transmission resources can be improved.

Further, the mobile phone 200 and the left earbud 201-1 may calculate a CIS (1).x+1 anchor point (namely, a CIG (x+1) anchor point) based on the CIS (1).x anchor point (namely, the CIG (x) anchor point) and the ISO interval shown in any one of FIG. 7A, FIG. 8, or FIG. 9A, and perform audio data transmission in a corresponding transmission manner (for example, a transmission manner of serial scheduling, interleaved scheduling, or joint scheduling) in a CIG event (x+1). Similarly, the mobile phone 200 and the right earbud 201-2 may calculate a CIS (2).x+1 anchor point based on the CIS (2).x anchor point and an ISO interval (namely, duration between the CIS (2).x anchor point and the CIS (2).x+1 anchor point), and perform audio data transmission in a corresponding transmission manner in the CIG event (x+1).

The mobile phone 200 and the left and right earbuds of the TWS headset 201 may perform audio data transmission in a CIG event (x+n) in the same transmission manner as the CIG event (x), where n is greater than or equal to 1, and n is an integer. For a method in which the mobile phone 200 and the left and right earbuds of the TWS headset 201 perform audio data transmission in the CIG event (x+n) in the same transmission manner as the CIG event (x), refer to the method for audio data transmission in the CIG event (x). Details are not described herein in this embodiment of this application.

Some other embodiments of this application further provide a peripheral device. For example, the peripheral device is a TWS headset. For a structure of an earbud of the TWS headset, refer to the structure of the earbud shown in FIG. 2B. The memory of the earbud may store one or more computer programs. The one or more computer programs include instructions. The instructions may be used to execute functions or steps executed by the earbud (for example, the left earbud or the right earbud) of the TWS headset in the description corresponding to any one of FIG. 5A, FIG. 5B, FIG. 5C, FIG. 6A, FIG. 6B, FIG. 7A, FIG. 7B, FIG. 7C, FIG. 8, FIG. 9A, or FIG. 9B. Certainly, the earbud of the TWS headset shown in FIG. 2B may further include another component such as a sensor. This is not limited in the embodiments of this application.

Some other embodiments of this application further provide an electronic device. The electronic device may include one or more processors, a memory, and one or more computer programs. These components may be connected by using one or more communications buses. The one or more computer programs are stored in the memory and configured to be executed by the one or more processors. The one or more computer programs include instructions, and the instructions may be used to execute the functions or steps executed by the mobile phone 200 in the description corresponding to any one of FIG. 5A, FIG. 5B, FIG. 5C, FIG. 6A, FIG. 6B, FIG. 7A, FIG. 7B, FIG. 7C, FIG. 8, FIG. 9A, or FIG. 9B. For a structure of the electronic device, refer to the structure of the electronic device 100 shown in FIG. 3.

The foregoing descriptions about implementations allow a person skilled in the art to clearly understand that, for the purpose of convenient and brief description, division into the foregoing function modules is merely used as an example for description. In actual application, the foregoing functions can be allocated to different function modules for implementation based on a requirement. In other words, an inner structure of an apparatus is divided into different function modules to implement all or some of the functions described above. For a detailed working process of the foregoing system, apparatus, and units, refer to a corresponding process in the foregoing method embodiments, and details are not described herein again.

In the several embodiments provided in this embodiment, it should be understood that the disclosed system, apparatus, and method may be implemented in another manner. For example, the foregoing apparatus embodiments are merely an example. For example, the module or unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this embodiment may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this embodiment essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:
1. A method, comprising:
sending audio data to a first earbud of a true wireless stereo (TWS) headset through a first connected isochronous stream (CIS) in a first connected isochronous group (CIG) from a first anchor point of the first CIS; and sending the audio data to a second earbud of the TWS headset through a second CIS in the first CIG from a second anchor point of the second CIS,
wherein the first CIS and the second CIS share a CIG presentation point of the first CIG, and
wherein the CIG presentation point is a time point at which the first earbud and the second earbud play the audio data.

2. The method of claim 1, wherein the first anchor point is different from the second anchor point, wherein each of the first CIS and the second CIS comprises a plurality of CIS events, wherein the first CIG comprises a plurality of CIG events, wherein each of the CIG events comprises one CIS event of the first CIS and one CIS event of the second CIS, wherein in a CIG event, the first anchor point is a CIG anchor point and the second anchor point is the same as an end point of a CIS event of the first CIS, and wherein the CIG anchor point is a start time point of the CIG event.

3. The method of claim 1, wherein the first anchor point is different from the second anchor point, wherein each of the first CIS and the second CIS comprises a plurality of CIS events, wherein the first CIG comprises a plurality of CIG events, wherein each of the CIG events comprises one CIS event of the first CIS and one CIS event of the second CIS, wherein each of CIS events of the first CIS comprises N1 subevents, wherein N1 is greater than or equal to 2, wherein each of CIS events of the second CIS comprises N2 subevents, wherein N2 is greater than or equal to 2, wherein in a CIG event, the first anchor point is a CIG anchor point, the second anchor point is the same as an end point of a first subevent in a CIS event of the first CIS, and a start point of a second subevent of the first CIS is an end point of a first subevent of the second CIS, and wherein the CIG anchor point is a start time point of the CIG event.

4. The method of claim 1, wherein the first anchor point is the same as the second anchor point, wherein the first CIG comprises a plurality of CIG events, wherein in a CIG event, both the first anchor point and the second anchor point are CIG anchor points, and wherein the CIG anchor point is a start time point of the CIG event.

5. The method of claim 4, further comprising sending, for each of the CIG events of the first CIG, the audio data in a frequency hopping manner through the first CIS and the second CIS from a CIG anchor point of each of the CIG events.

6. The method of claim 1, wherein before sending the audio data to the first earbud, the method further comprises:
configuring the first CIS for the first earbud to transmit the audio data to the first earbud; and
configuring the second CIS for the second earbud to transmit the audio data to the second earbud.

7. The method of claim 6, further comprising:
further configuring the first CIS for the first earbud through a first asynchronous connection-oriented link (ACL) between an electronic device and the first earbud; and
further configuring the second CIS for the second earbud through a second ACL between the electronic device and the second earbud.

8. The method of claim 7, wherein before configuring the first CIS and configuring the second CIS, the method further comprises:
pairing with the first earbud;
pairing with the second earbud;
establishing the first ACL with the first earbud;
establishing the second ACL with the second earbud;
negotiating, through the first ACL, first configuration information with the first earbud, wherein the first configuration information comprises a first identifier of the first CIG, a first parameter of the first CIS, and a CIG presentation delay of the first CIG; and
negotiating, through the second ACL, second configuration information with the second earbud, wherein the second configuration information comprises the first identifier, a second parameter of the second CIS, and the CIG presentation delay,
wherein the first parameter is a first transmission parameter for transmitting the audio data between the electronic device and the first earbud,
wherein the second parameter is a second transmission parameter for transmitting the audio data between the electronic device and the second earbud, and
wherein the CIG presentation delay enables the first earbud and the second earbud to obtain the CIG presentation point.

9. The method of claim 8, wherein the first parameter comprises a second identifier of the first CIS, N1, a first retransmission parameter, a first sub-interval, a first time parameter, a first synchronization delay, and the CIG presentation delay, wherein the first CIS comprises N1 subevents, wherein N1 and the first retransmission parameter indicate a policy for retransmission of the audio data to the first earbud, wherein the first sub-interval is a time period between a start time point of a subevent in the first CIS and a start time point of a next subevent in the first CIS, wherein the first time parameter identifies the first anchor point, wherein the first synchronization delay identifies a CIG synchronization point that is a time point after the first synchronization delay from the first anchor point, and wherein the CIG presentation delay is a time period between the CIG synchronization point and the CIG presentation point.

10. The method of claim 9, wherein the first parameter further comprises a first payload parameter and a second payload parameter, and wherein each of the N1 subevents comprises:
a first transmission interval to transmit the audio data to the first earbud, wherein the first payload parameter indicates a size of audio data that can be transmitted within the first transmission interval; and
a second transmission interval to receive the audio data from the first earbud, wherein the second payload parameter indicates a size of audio data that can be transmitted within the second transmission interval.

11. The method of claim 8, wherein the second parameter comprises a third identifier of the second CIS, N2, a second retransmission parameter, a second sub-interval, a second time parameter, a second synchronization delay, and the CIG presentation delay, wherein the second CIS comprises N2 subevents, wherein N2 and the second retransmission parameter indicates a policy for retransmission of the audio data to the second earbud, wherein the second sub-interval is a time period between a start time point of a subevent in the second CIS and a start time point of a next subevent in the second CIS, wherein the second time parameter identifies the second anchor point, wherein the second synchronization delay identifies a CIG synchronization point that is a time point after the second synchronization delay from the second anchor point, and wherein the CIG presentation delay is a time period between the CIG synchronization point and the CIG presentation point.

12. The method of claim 11, wherein the second parameter further comprises a third payload parameter and a fourth payload parameter, and wherein each of the N2 subevents comprises:
- a third transmission interval to transmit the audio data to the second earbud, wherein the third payload parameter indicates a size of audio data that can be transmitted within the third transmission interval; and
- a fourth transmission interval to receive the audio data from the second earbud, wherein the fourth payload parameter indicates a size of audio data that can be transmitted within the fourth transmission interval.

13. The method of claim 8, wherein the first configuration information and the second configuration information further comprise an isochronous (ISO) interval, wherein each of the first CIS and the second CIS comprises a plurality of CIS events, wherein the first CIG comprises a plurality of CIG events, wherein each of the CIG events comprises one CIS event of the first CIS and one CIS event of the second CIS, wherein the first anchor point of a CIS event of the first CIS in a CIG event, wherein the second anchor point is of a CIS event of the second CIS in the CIG event, wherein the ISO interval is a time period between an anchor point of a CIS event in the first CIS or the second CIS and an anchor point of a next CIS event in the first CIS or the second CIS, wherein each of the CIG events belongs to one ISO interval in terms of time, and wherein each of the CIS events belongs to the one ISO interval in terms of time.

14. A method implemented by a true wireless stereo (TWS) headset, wherein the method comprises:
- receiving, using a first earbud of the TWS headset, audio data from an electronic device through a first connected isochronous stream (CIS) in a first connected isochronous group (CIG) from a first anchor point of the first CIS;
- receiving, using a second earbud, the audio data from the electronic device through a second CIS in the first CIG from a second anchor point of the second CIS, wherein the first CIS and the second CIS share a CIG presentation point of the first CIG; and
- playing, using the first earbud and the second earbud, the audio data at the CIG presentation point of the first CIG.

15. The method of claim 14, wherein before receiving the audio data, the method further comprises:
- receiving, using the first earbud, the first CIS for transmission of the audio data between the electronic device and the first earbud; and
- receiving, using the second earbud, the second CIS for transmission of the audio data between the electronic device and the second earbud.

16. The method of claim 15, further comprising:
- further receiving, using the first earbud through a first asynchronous connection-oriented link (ACL), the first CIS, wherein the first ACL between the electronic device and the first earbud; and
- further receiving, using the second earbud through a second ACL, the second CIS, wherein the second ACL is between the electronic device and the second earbud.

17. The method of claim 16, wherein before receiving the first CIS and the second CIS, the method further comprises:
- pairing the first earbud with the electronic device;
- pairing the second earbud with the electronic device;
- establishing, using the first earbud, the first ACL with the electronic device;
- establishing, using the second earbud, the second ACL with the electronic device;
- negotiating, using the first earbud, first configuration information with the electronic device through the first ACL, wherein the first configuration information configures the first CIS, wherein the first configuration information comprises an identifier of the first CIG, a first parameter of the first CIS, and a CIG presentation delay of the first CIG, and wherein the first parameter is a first transmission parameter for transmission of the audio data between the electronic device and the first earbud;
- negotiating, using the second earbud, second configuration information with the electronic device through the second ACL, wherein the second configuration information configures the second CIS in the first CIG, wherein the second configuration information comprises the identifier, a second parameter of the second CIS, and the CIG presentation delay, and wherein the second parameter is a second transmission parameter for transmission of the audio data between the electronic device and the second earbud; and
- obtaining, using the CIG presentation delay by the first earbud and the second earbud, the CIG presentation point.

18. An apparatus, comprising:
- a memory configured to store a computer program code; and
- one or more processors coupled to the memory, wherein the computer program code causes the one or more processors to be configured to:
  - send audio data to a first earbud of a true wireless stereo (TWS) headset through a first connected isochronous stream (CIS) in a first connected isochronous group (CIG) from a first anchor point of the first CIS; and
  - send the audio data to a second earbud of the TWS headset through a second CIS in the first CIG from a second anchor point of the second CIS,
  - wherein the first CIS and the second CIS share a CIG presentation point of the first CIG, and
  - wherein the CIG presentation point is a time point at which the first earbud and the second earbud play the audio data.

19. The apparatus of claim 18, wherein the first anchor point is different from the second anchor point, wherein each of the first CIS and the second CIS comprise a plurality of CIS events, wherein the first CIG comprises a plurality of CIG events, wherein each of the CIG events comprises one CIS event of the first CIS and one CIS event of the second CIS, wherein in a CIG event, the first anchor point is a CIG anchor point, wherein the second anchor point is the same as an end point of a CIS event of the first CIS, and wherein the CIG anchor point is a start time point of the CIG event.

20. The apparatus of claim 18, wherein the first anchor point is different from the second anchor point, wherein each of the first CIS and the second CIS comprise a plurality of CIS events, wherein the first CIG comprises a plurality of CIG events, wherein each of the CIG events comprises one CIS event of the first CIS and one CIS event of the second CIS, wherein each of CIS events of the first CIS comprises N1 subevents, wherein N1 is greater than or equal to 2, wherein each of CIS events of the second CIS comprises N2 subevents, wherein N2 is greater than or equal to 2, wherein in a CIG event, the first anchor point is a CIG anchor point, the second anchor point is the same as an end point of a first subevent in a CIS event of the first CIS, and a start point of a second subevent of the first CIS is an end point of a first subevent of the second CIS, and wherein the CIG anchor point is a start time point of the CIG event.

* * * * *